US 6,564,140 B2

(12) United States Patent
Ichikawa et al.

(10) Patent No.: US 6,564,140 B2
(45) Date of Patent: May 13, 2003

(54) VEHICLE DYNAMICS CONTROL SYSTEM AND VEHICLE HAVING THE VEHICLE DYNAMICS CONTROL SYSTEM

(75) Inventors: Katsufumi Ichikawa, Tokyo (JP); Takayuki Ushijima, Tokyo (JP); Ryo Nitta, Tokyo (JP); Katsumi Tomioka, Tokyo (JP); Osamu Kobayashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/909,182

(22) Filed: Jul. 19, 2001

(65) Prior Publication Data

US 2002/0045981 A1 Apr. 18, 2002

(30) Foreign Application Priority Data

Aug. 3, 2000 (JP) ........................................ 2000-236015

(51) Int. Cl.⁷ ............................................. B60K 41/24
(52) U.S. Cl. ............................ 701/91; 701/69; 701/70; 701/82; 180/197; 303/139; 303/143; 303/196; 340/901; 340/905
(58) Field of Search ............................... 701/91, 69, 70, 701/71, 78, 80, 82, 83; 180/197; 303/139, 143, 196; 340/905, 901

(56) References Cited

U.S. PATENT DOCUMENTS 5,328,255 A * 7/1994 Isella ......................... 180/197

| 5,436,835 A | * | 7/1995 | Emry ........................ 340/995 |
| 5,711,585 A | * | 1/1998 | Tozu et al. ................. 303/140 |
| 5,752,214 A | * | 5/1998 | Minowa et al. ............. 701/111 |
| 5,902,345 A | * | 5/1999 | Minowa et al. ............. 701/111 |
| 5,984,435 A | * | 11/1999 | Tsukamoto et al. ......... 180/169 |
| 6,062,659 A | * | 5/2000 | Matsuda et al. ............ 303/155 |
| 6,076,034 A | * | 6/2000 | Satoh et al. ................ 180/168 |

FOREIGN PATENT DOCUMENTS

| JP | 9-290655 A | 11/1997 |
| JP | 2000-127931 A | 5/2000 |

* cited by examiner

Primary Examiner—William A. Cuchlinski, Jr.
Assistant Examiner—Eric M Gibson
(74) Attorney, Agent, or Firm—Frishauf, Holtz, Goodman & Chick, P.C.

(57) ABSTRACT

A correction factor setting unit sets correction factors for a front-rear traction distribution control unit, an anti-lock brake control unit, a traction control unit, and a braking power control unit according to the situation of a road and the shape thereof which are inputted from a road information recognizing unit. At this time, the correction factors are preset values according to the situation of the road and the shape thereof so that the actions of the control units will be balanced with each other. Consequently, the plurality of vehicle behavior control units mounted in a vehicle act efficiently according to the situation of the road, on which the vehicle is driven forwards, and the shape thereof while quickly responding to the situation of the road and the shape thereof. Besides, the actions of the vehicle behavior control units are balanced with one another.

16 Claims, 9 Drawing Sheets

VEHICLE DYNAMICS CONTROL SYSTEM AND VEHICLE HAVING THE VEHICLE DYNAMICS CONTROL SYSTEM

BACKGROUND OF THE INVENTION

1. Field of the Invention

The present invention relates to a vehicle dynamics control system (vehicle motion control system) that enables a plurality of vehicle behavior control units to act properly according to the conditions of a road on which a vehicle is driven, and a vehicle having the vehicle dynamics control system. Herein, the plurality of the vehicle behavior control units include a front-rear traction distribution control unit for for wheel drive vehicles, an anti-lock brake control unit, a traction control unit, and a braking power control unit which are mounted on the vehicle.

2. Description of the Related Art

In recent years, various vehicle behavior control units including a front-rear traction distribution control unit for four wheel drive vehicles, an anti-lock brake control unit, a traction control unit, and a braking power control unit have been mounted in a vehicle.

The vehicle behavior control units are each properly controlled based on driving conditions of the vehicle or an environment in which the vehicle is driven. For example, Japanese Unexamined Patent Publication No. 9-290655 has disclosed an art of the front-rear traction distribution control unit for four wheel drive vehicles. The front-rear traction distribution control unit timely and adequately detects the situation of a road to be attained at a time instant, at which the vehicle is actually driven on the road, based on the driving conditions of a preceding vehicle. The front-rear traction distribution control unit then controls a torque distribution rate, at which a driving force is distributed to front wheels and rear wheels, according to the detected situation of the road.

Moreover, Japanese Unexamined Patent Application Publication No. 2000-127931 has disclosed an art of calculating and correcting a magnitude of operation. Specifically, an actual kinetic state of a vehicle is compared with a reference kinetic state in order to calculate the magnitude of operation to be performed to control the behavior of the vehicle. A braking force and a driving force for the vehicle are controlled based on the magnitude of operation. The direction of the road estimated based on information provided by a navigation system is compared with a direction in which the vehicle is driven forwards and which is estimated based on the kinetic state of the vehicle in order to correct the magnitude of operation.

However, although the foregoing vehicle behavior control units each act properly, when they are mounted in a vehicle, they may act all together so as to keep the driving condition of the vehicle at an optimal state, and eventually excessively control the vehicle.

Moreover, when the plurality of the vehicle behavior control units are mounted in the vehicle, the magnitudes of controls by which the vehicle behavior control units act and the sensibilities of the vehicle behavior control units may be modified or adjusted. However, the timing is most important to control the behavior of the vehicle. A time-varying change in the driving condition of the vehicle must be reflected on the magnitudes of the controls, by which the vehicle behavior control units act, so that the vehicle behavior control units can respond to the time-varying change as quickly as possible.

SUMMARY OF THE INVENTION

Accordingly, an object of the present invention is to provide a vehicle dynamics control system and a vehicle having the vehicle dynamics control system, wherein the vehicle dynamics control system enables a plurality of vehicle behavior control units mounted in a vehicle to act efficiently while responding quickly to road conditions and shape of a road on which the vehicle is driven, and wherein the vehicle behavior control units are well-balanced with one another. Consequently, the vehicle dynamics control system enables the vehicle behavior control units to optimally control the motion of the vehicle.

For accomplishing the object, according to the present invention, there is provided a vehicle dynamics control system comprising road information recognizing means, vehicle behavior control means, and variable control means. The road information recognizing means detects and recognizes the situation of the road. The vehicle behavior control means controls a behavior of a vehicle. The variable control means can vary depending on the situation of the road and the shape thereof at least either the magnitudes of control or the sensibility of the vehicle behavior control means in intervening in control actions.

The above and other objects, features and advantages of the invention will be become more clearly understood from the following description when referring to the accompanying drawings.

DESCRIPTION OF THE PREFERRED EMBODIMENTS

Figure 1:
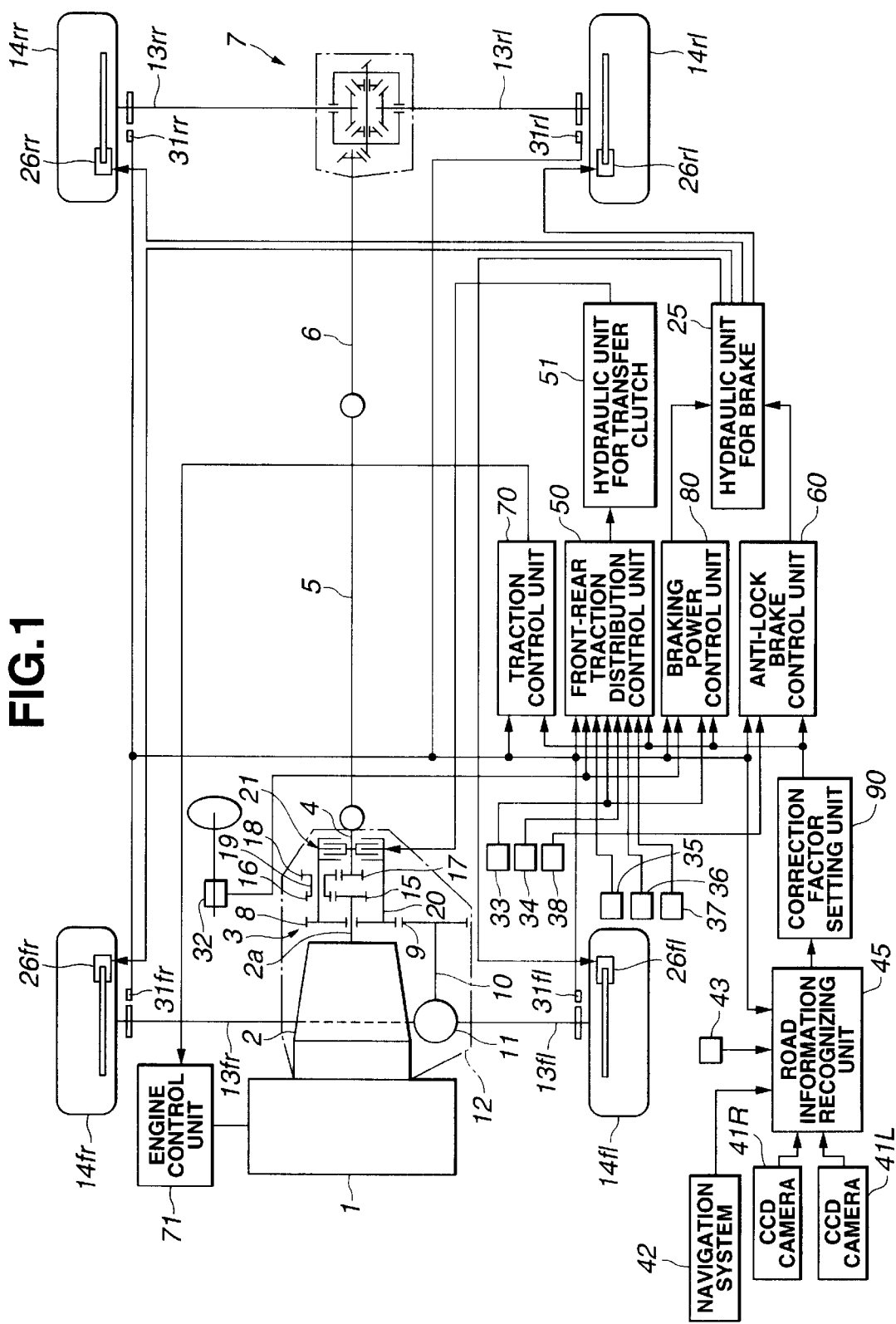
FIG. 1 is an explanatory diagram showing the outline configuration of a vehicle having a plurality of vehicle behavior control units.

Referring to the drawings, an embodiment of the present invention will be described below.

Referring to FIG. 1, an engine 1 is located in a front portion of a vehicle. A driving force the engine 1 exerts is transmitted to a center differential 3 from an automatic transmission (shown to include a torque converter) 2 located behind the engine 1 through a transmission output shaft 2a.

Furthermore, the driving force transmitted to the center differential 3 is inputted to a rear-wheel final reduction gear device 7 through a rear driving axle 4, a propeller shaft 5, and a driving pinion shaft 6. The driving force is also inputted to a front-wheel final reduction gear device 11 through a transfer driving gear 8, a transfer driven gear 9, and a front driving axle 10 serving as a driving pinion shaft. Herein, the automatic transmission 2, center differential 3, and front-wheels final reduction device 11 are integrally provided into a casing 12.

Moreover, the driving force inputted to the rear-wheel final reduction gear device 7 is transmitted to a left rear wheel 14rl through a left rear-wheel driving axle 13rl and to a right rear wheel 14rr through a right rear-wheel driving axle 13rr. On the other hand, the driving force inputted to the front-wheel final reduction gear device 11 is transmitted to a left front wheel 14fl through a left front-wheel driving axle 13fl and to a right front wheel 14fr through a right front-wheel driving axle 13fr.

The center differential 3 has a first sun gear 15 of a large diameter formed on the transmission output shaft 2a that serves as an input member. The first sun gear 15 is meshed with a first pinion 16 of a small diameter, thus forming a first gear train.

Moreover, a second sun gear 17 of a small diameter is formed on the rear driving axle 4 through which a power is outputted to the rear wheels. The second sun gear 17 is meshed with a second pinion 18 of a large diameter, thus forming a second gear train.

The first pinion 16 and the second pinion 18 are integrally formed with a pinion member 19. A plurality of (for example, three) pinion members 19 is borne by a shaft fixed to a carrier 20 so that the pinion members 19 can rotate freely. A transfer driving gear 8 is coupled to the front end of the carrier 20. A power is transmitted to the front wheels through the transfer driving gear 8.

The transmission output shaft 2a is inserted into the face of the carrier 20 so that the transmission output shaft 2a can revolve freely. The rear driving axle 4 is inserted into the back of the carrier 20 so that the rear driving axle 4 can revolve freely. The first sun gear 15 and the second sun gear 17 are stored in the center space of the carrier 20. The first pinions 16 of the plurality of pinion members 19 are meshed with the first sun gear 15, and the second pinions 18 of the plurality of pinion member 19 are meshed with the second sun gear 17.

The first sun gear 15 that is the input member of the center differential 3 is meshed with one output member (rear wheel side) thereof via the first and second pinions 16 and 18 and the second sun gear 17. The first sun gear 15 is meshed with the other output member (front wheel side) thereof via the carrier 20 accommodating the first and second pinions 16 and 18. These gears therefore form a complex planetary gear train devoid of a ring gear.

In the complex planetary gear train type center differential 3, once the number of teeth of the first sun gear 15 and second sun gear 17 and the number of teeth of the first pinions 16 and second pinions 18, which are arranged around the sun gears 15 and 17, are set to appropriate values, the gears serve as differential gears.

Moreover, in the center differential 3, once the radius of the pitch circle of the first and second pinions 16 and 18 and the pitch circle of the first and second sun gears 15 and 17 are set to appropriate values, a reference torque distribution rate at which the center differential 3 distributes the driving force to the front wheels and rear wheels can be set to a desired value (for example, an equal torque distribution rate at which a majority of driving force is distributed to the rear wheels).

Furthermore, in the center differential 3, the first and second sun gears 15 and 17 and the first and second pinions 16 and 18 may be formed with, for example, helical gears. The helix angles of the first gear train and of the second gear train are differentiated from each other so that a thrust load will not be canceled but left. In the center differential 3, a frictional torque is generated at the ends of each pinion member 19 when a resultant load of a segregative load and a tangential load that stem from meshing works on the first and second pinions 16 and 18 and on the surface of the shaft fixed to the carrier 20. This results in a slip limiting torque proportional to an input torque. Consequently, the center differential 3 itself can obtain the capability of a limited slip differential.

Moreover, a transfer clutch 21 deploying a hydraulic multi-plate clutch and designed to vary a distribution of the driving force between the front wheels and rear wheels is interposed between the carrier 20 included in the center differential 3 and the rear driving axle 4. A tightening force to be exerted in tightening the transfer clutch 21 is controlled in order to vary a distribution of the driving force to the front wheels and rear wheels. Specifically, a torque distribution rate is varied within a range from 50:50, which is adopted for the four wheel drive vehicle, to a torque distribution rate determined by the center differential 3 (the aforesaid torque distribution rate permitting a distribution of a majority of driving force to the rear wheels, for example, 35:65).

The transfer clutch 21 is connected to a hydraulic unit for transfer clutch 51 that is comprised of a hydraulic circuit including a plurality of solenoid valves. An oil pressure generated by the hydraulic unit 51 is used to release or tighten the transfer clutch. A front-rear traction distribution control unit 50 outputs a control signal (output signal to each solenoid valve) that is used to drive the hydraulic unit 51.

Numeral 25 denotes a hydraulic unit for a brake 25. A master cylinder (not shown) connected to a brake pedal a driver steps on is connected to the hydraulic unit for the brake 25 that drives a brake mechanism mounted in the vehicle. When the driver steps on the brake pedal, a respective braking pressure is introduced from the master cylinder into wheel cylinders of the four wheels 14fl, 14fr, 14rl, and 14rr through the hydraulic unit for brake 25. The wheel cylinders are a left front-wheel cylinder 26fl, a right front-wheel cylinder 26fr, a left rear-wheel cylinder 26rl, and a right rear-wheel cylinder 26rr. Owing to the brake mechanism, the four wheels are braked.

The hydraulic unit for the brake 25 is a hydraulic unit having a pressurization device, a decompression valve, a booster valve, and others. The hydraulic unit for the brake 25 drives, as mentioned above, the brake mechanism in response to an instruction entered by the driver. In addition, the hydraulic unit for brake 25 introduces a braking pressure to each of the wheel cylinders 26fl, 26fr, 26rl, and 26rr according to an input signal sent from an anti-lock brake control unit 60 or a braking power control unit 80 that will be described later.

Moreover, an engine control unit 71 controls the engine 1 in various aspects, for example, controls injection of a fuel into the engine. An output signal sent from a traction control unit 70 that will be described later is inputted to the engine control unit 71.

The foregoing front-rear traction distribution control unit 50, the anti-lock brake control unit 60, the traction control unit 70, and the braking power control unit 80 are each included as vehicle behavior control means. A correction factor setting unit 90 that outputs a signal to each of the control units 50, 60, 70, and 80 is mounted in the vehicle.

The vehicle has various sensors and switches that are used to detect parameters, based on which the control units 50, 60, 70, and 80 control associated control actions. Specifically, wheel speed sensors 31fl, 31fr, 31rl, and 31rr detect the wheel speeds of the wheels 14fl, 14fr, 14rl, and 14rr. The detected wheel speeds are inputted to the front-rear traction control unit 50, the anti-lock brake control unit 60, the traction control unit 70, and the braking power control unit 80, respectively. A steering wheel angle sensor 32 detects a steering wheel angle θH. A yaw rate sensor 33 detects a yaw rate γ. The steering wheel angle θH and yaw rate γ are inputted to the front-rear traction distribution control unit 50 and to the braking power control unit 80. A lateral acceleration sensor 34 detects a lateral acceleration Gy. A throttle angle sensor 35 detects a throttle angle θth. A position of a gear is detected by using an inhibitor switch 36. An engine speed sensor 37 detects the number of engine revolutions Ne. The lateral acceleration Gy, the throttle angle θth, the gear position, and the engine revolution number Ne are inputted to the front-rear traction distribution control unit 50. Whether the brake mechanism is turned on or off is detected by using a brake pedal switch 38 and inputted to the anti-lock brake control unit 60.

Moreover, the vehicle includes a stereoscopic optical system that is connected to a road information recognizing unit 45. The stereoscopic optical system includes a pair of CCD cameras (a left camera 41L and a right camera 41R) each having a solid-state imaging element, for example, a charge-coupled device (CCD). The right and left CCD cameras 41R and 41L are hung on the front part of the ceiling in the vehicle with a certain distance. The right and left CCD cameras 41R and 41L pick up an image of an object located outside to enable stereoscopy of the object.

The vehicle has a navigation system 42 mounted therein. The navigation system 42 is connected to the road information recognizing unit 45. Position data (including nodes of roads, links, road types, and a current position) is inputted to the road information recognizing unit 45. A longitudinal acceleration sensor 43 that detects a longitudinal acceleration Gx is connected to the road information recognizing unit 45. The wheel speed sensors 31fl, 31fr, 31rl, and 31rr are also connected to the road information recognizing unit 45.

Based on image data sent from the right and left CCD cameras 41R and 41L, the road information recognizing unit 45 classifies the situation of the road, on which the vehicle is driven forwards, into any of four categories of snowy, unpaved (a dirt road), wet and paved, and dry and paved. The classified situation of the road is outputted to the setting unit 90.

Specifically, the road information recognizing unit 45 calculates a distance to the object based on the parallax of the object caused by the right and left CCD cameras 41R and 41L. The road information recognizing unit 45 recognizes the three-dimensional shape of the road based on the image data and the distance data representing the calculated distance.

The road information recognizing unit 45 judges a snowy road as described in, for example, Japanese Patent Application No. 11-216191 filed by the present assignee. Namely, a monitoring area that is a predetermined area within image data obtained by each of the right and left CCD cameras 41R or 41L is checked to see if the whole surface of the road is snowy. Specifically, the road information recognizing unit 45 calculates the number of changes in a luminance (referred to as luminance edges) acquired in a horizontal direction from the monitoring area. The road information recognizing unit 45 also calculates the magnitude of the overall luminance acquired from the monitoring area. When the number of the luminance edges is smaller than a criterion and the magnitude of the overall luminance is larger than the criterion, the road information recognizing unit 45 recognizes that the whole surface of the road is snowy and judges a snowy road.

Moreover, the road information recognizing unit 45 detects if the road on which the vehicle is driven forwards is a dirt road, a wet paved road, or a dry paved road according to a method described in Japanese Patent Application No. 11-216373 filed by the present assignee. Namely, the road information recognizing unit 45 detects the number of changes in the luminance (luminance edges) in a horizontal direction in the image data monitoring area defined within the image data. The road information recognizing unit 45 acquires a coordinate on a height-direction coordinate axis in a distance monitoring area defined within a coordinate plane used to express the distance data. If the coordinate on the height-direction coordinate axis is equal to or larger than −0.4 m and equal to or smaller than 0.3 m, the road information recognizing unit 45 recognizes the coordinate as a dry road value. The dry road value signifies a road with a white line, a road with a rut, or a graveled road. When the coordinate on the height-direction coordinate axis is smaller than −0.4 m, the road information recognizing unit 45 recognizes the coordinate as a wet paved road value. The road information recognizing unit 45 classifies the dry road value into a category of a road with a white line, a road with a rut, or a graveled road. If the number of the changes in the luminance (luminance edges) acquired from the monitoring domain within image data is large and the dry road value is smaller than a set value, the road information recognizing unit 45 judges that the road is a dry paved road. Moreover, if the number of the changes in the luminance (luminance edges) acquired from the image data monitoring domain is small and the dry road value is large, the road information recognizing unit 45 detects the road as a dirt road such as a graveled road. If the dry road value is small, the road information recognizing unit 45 detects the road as the dry paved road such as a paved road devoid of the white line. The method of detecting the situation of the road to see if the road on which the vehicle is driven forwards is the snowy road, the dirt road, the wet paved road, or the dry paved road is not limited to the aforesaid one.

Moreover, the road information recognizing unit 45 classifies the shape of the road, on which the vehicle is driven forwards, into a category of curved or not curved according to information from the navigation system 42 to output the classified shape data to the correction factor setting unit 90. Whether the road is curved or not is detected by using an art disclosed in Japanese Unexamined Patent Publication No. 11-2528 filed by the present assignee. The art will be described briefly.

Figure 2:
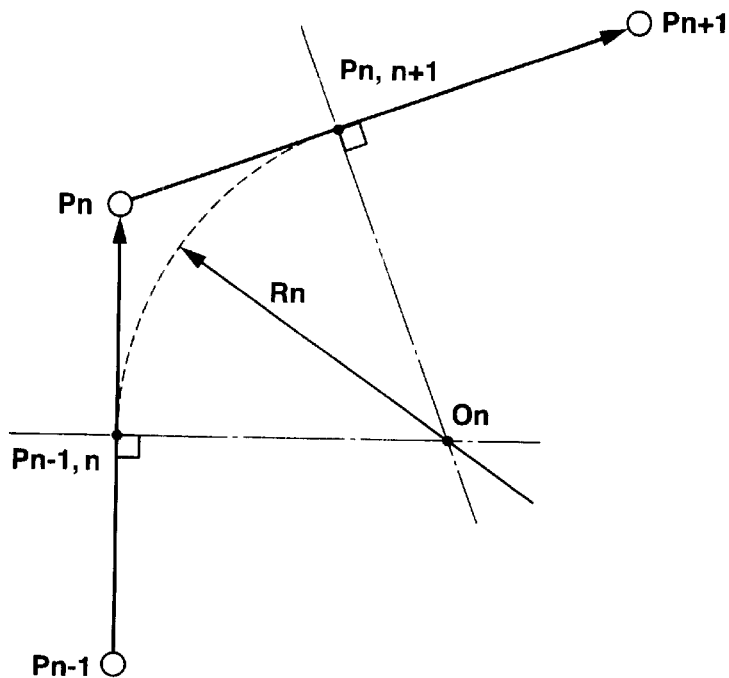
FIG. 2 is an explanatory diagram concerning calculation of a radius of curvature of a curve.

The road information recognizing unit 45 chooses three points, which are located forwards within a small range of about 100 m on the road, from point data that represents the road and that is inputted from the navigation system 42. Specifically, as shown in FIG. 2, the road information recognizing unit 45 sequentially reads a first point Pn−1, a second point Pn, and a third point Pn+1 orderly (from the point located closest to the vehicle) at a predetermined interval. Assume that a point representative of the curve of the road is the point Pn. Accordingly, data concerning a curve inscribed by a point P1 is calculated by using data of points P0, P1, and P2, data concerning a curve inscribed by the point P2 is calculated by using data of the points P1, P2 and a point P3, and so on. Data concerning a curve inscribed by the point Pn is calculated by using data of the points Pn−1, Pn, and Pn+1.

In order to detect the curve inscribed by the point Pn, the road information recognizing unit 45 obtains a straight line linking the first point Pn−1 and second point Pn by using the position data of the first point Pn−1 and second point Pn. Moreover, the road information recognizing unit 45 obtains a straight line linking the second point Pn and third point Pn+1 by using the position data of the second point Pn and third point Pn+1.

The road information recognizing unit 45 compares the straight line linking the first point Pn−1 and second point Pn with the straight line linking the second point Pn and third point Pn+1, and judges which of the straight lines is shorter, or longer. Consequently, the road information recognizing unit 45 acquires the position data and distance data of a shorter straight line, calculates a half of the distance indicated with the shorter straight line, and determines a middle point on the shorter straight line. Herein, the straight line linking the first point Pn−1 and second point Pn shall be shorter and the middle point on the shorter straight line shall be point Pn−1,n.

The road information recognizing unit 45 acquires the position data and distance data of the longer straight line and the half of the distance indicated with the shorter straight line. The road information recognizing unit 45 then determines as a middle equidistant point, that is, a point separated by the half of the distance indicated with the shorter straight line from the second point on the longer straight line. Herein, the straight line linking the second point Pn and third point Pn+1 shall be the longer straight line, and the middle equidistant point shall be Pn,n+1.

The road information recognizing unit 45 acquires the position data of the middle point Pn−1,n and the position data of the calculated middle equidistant point Pn,n+1. The road information recognizing unit 45 then determines an intersection point between a straight line, which crosses the shorter straight line (Pn−1Pn) at right angles at the middle point Pn−1,n, and a straight line, which crosses the longer straight line (PnPn+1) at right angles at the middle equidistant point Pn,n+1, as a center point On of a circle containing the curve of the road on which the vehicle is driven forwards. The road information recognizing unit 45 then calculates a radius of curvature Rn of the curve of the road, on which the vehicle is driven, by regarding the center point On of the circle containing the curve as a center of a circle of the curvature.

Figure 3:
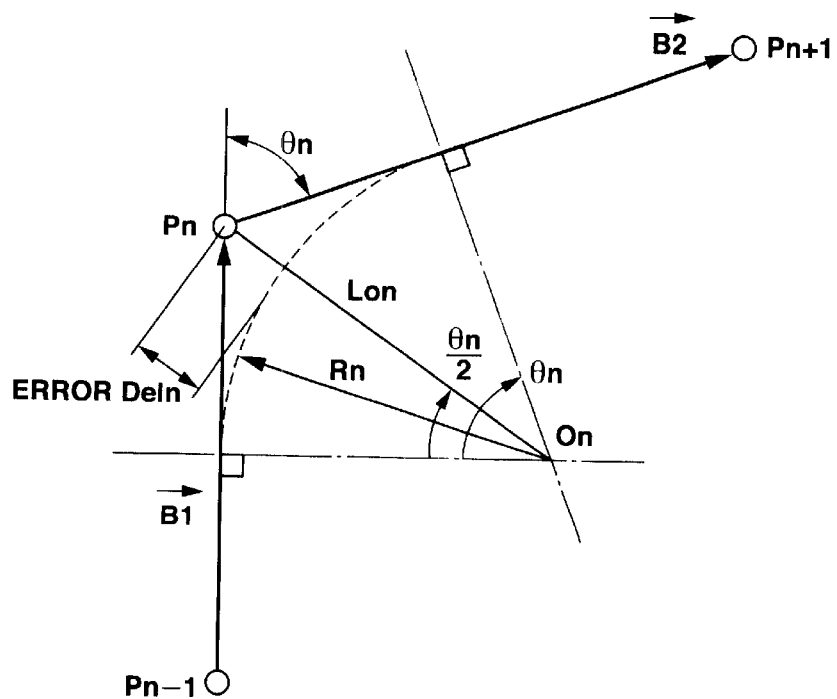
FIG. 3 is an explanatory diagram concerning correction of a calculated radius of curvature of a curve.

Furthermore, the road information recognizing unit 45 calculates, as shown in FIG. 3, a difference Deln between the radius of curvature Rn and a distance Lon from the center point On to the second point Pn. If the difference Deln exceeds a preset error set value, the radius of curvature Rn is corrected in order to thus confine the difference Deln to the error value or less. The error set value is varied depending on both the width of the road and the distance indicated with the shorter straight line.

Thus, final curve data is calculated. The curve data includes the position of the point Pn representative of the curve, the distance Ln between the point Pn−1 and point Pn, the final radius of curvature Rn, and the center point of the circle containing the curve On. Moreover, the curve data includes angles θn of the curve at the points calculated from the angle at which the straight lines Pn−1Pn and PnPn+1 meet. The curve data also includes the distance between a start point Lsn of the curve (point that is an intersection between the straight line Pn−1Pn and a normal linked to the center point On of the curve containing the curve) and the point Pn−1, and the distance Lssn from the position of the vehicle to the point representative of the curve. Out of the curve data, if the radius of curvature Rn of the curve of the road on which the vehicle is driven forwards is smaller than a preset criterion of the curve, it is judged that the road is curved. If the radius of curvature Rn is larger than the criterion of a curve, it is judged that the road is not curved. The result of judgment is outputted to the setting unit 90.

Furthermore, the road information recognizing unit 45 calculates the inclination SL of the road by using the longitudinal acceleration received from the longitudinal acceleration sensor 43 and a vehicle speed calculated from the wheel speeds of the four wheels received from the wheel speed sensors 31$fl$, 31$fr$, 31$rl$, and 31$rr$. The road information recognizing unit 45 classifies the shape of the road, on which the vehicle is driven forwards, into a category of climbing, descending, or horizontal, and outputs the result of the classification to the setting unit 90.

The inclination of the road SL (%) is calculated based on a longitudinal acceleration and a change rate per set time of the vehicle speed (m/s$^2$) according to the following formula:

Inclination $SL$=(longitudinal acceleration−vehicle speed change rate/g)·100 where g (m/s$^2$) denotes a gravitational acceleration. Herein, an upward inclination shall assume a positive value.

If the calculated inclination SL is a positive value and the absolute value of the inclination is larger than a threshold that is a criterion of a climbing road and that is preset to a positive value, it is judged that the road is climbing. In contrast, if the calculated inclination SL is a negative value and the absolute value of the inclination is larger than a threshold that is a criterion of a descending road and that is preset to a negative value, it is judged that the road is descending. If the inclination SL is any other value, that is, if the inclination SL is a value intermediate between the threshold serving as the criterion of the climbing road and the threshold serving as the criterion of the descending road, it is judged that the road is horizontal. The result of judgment is outputted to the setting unit 90.

As mentioned above, the road information recognizing unit 45 is also as a road information recognizing means that detects and recognizes the situation of the road, on which the vehicle is driven forwards, and the shape thereof.

The setting unit 90 inputs the situation of the road and the shape thereof from the road information recognizing unit 45. The situation of the road signifies a snowy road, a dirt road, a wet paved road, or a dry paved road, and the shape thereof signifies a curved road or not, a climbing road, a descending road, or a horizontal road. The setting unit 90 selects any of preset values according to the received situation of the road and the received shape thereof, and outputs the selected values as correction factors, which will be described later, for the vehicle behavior control units 50, 60, 70, and 80 respectively.

Next, the vehicle behavior control units 50, 60, 70, and 80 will be described below.

The front-rear traction distribution control unit 50 estimates the cornering power of each of the front and rear wheels from the vehicle speed, the steering wheel angle, the actual yaw rate according to the method disclosed in Japanese Unexamined Patent Publication No. 8-2274 filed by the present assignee. In other words, the front-rear traction distribution control unit 50 calculates the cornering power by assigning the vehicle speed, the steering wheel angle, and the actual yaw rate to the equations of motion relevant to the lateral motion of the vehicle. Herein, the cornering power may have nonlinear relationships to the vehicle speed, the steering wheel angle, and the actual yaw rate. Based on the ratio of the estimated cornering power of each of the front and rear wheels to the equivalent cornering power thereof measured on the road that exhibits a high friction coefficient $\mu$ relative to the vehicle. The front-rear traction distribution control unit 50 references a pre-defined map and retrieves a clutch torque VTD0 that is adopted as a base and associated with the road friction coefficient $\mu$. The clutch torque VTD0 is corrected based on an input torque Ti applied to the center differential 3, a throttle angle $\theta$th, an actual yaw rate $\gamma$, a deviation of the actual yaw rate $\gamma$ from a target yaw rate $\gamma$t ($\Delta\gamma=\gamma-\gamma$t), and the lateral acceleration Gy. The input torque Ti is calculated by using the number of engine revolution (R.P.M.) Ne and a gear ratio i. Moreover, the target yaw rate $\gamma$t is calculated by using the steering wheel angle $\theta$H and the vehicle speed V. Consequently, a controlled output torque VTD (that is, a value based on which a basic clutch tightening force FOtb that determines how to distribute power to the front and rear wheels) is worked out. Furthermore, the front-rear traction distribution control unit 50 corrects the controlled output torque VTD according to the steering wheel angle $\theta$, and determines, as a steering wheel angle-based clutch torque, the basic clutch tightening force FOtb to be exerted in tightening the transfer clutch 21. Thereafter, the front-rear traction distribution control unit 50 multiplies the basic clutch tightening force FOtb by a clutch tightening force correction factor Ktr set by the setting unit 90, and thus works out a final basic clutch tightening force FOtb. A predetermined signal whose level corresponds to the basic clutch tightening force FOtb is outputted to the hydraulic unit for the transfer clutch 51. An hydraulic pressure generated by the hydraulic unit 51 is used to actuate the transfer clutch 21 so that the slip limiting force will be applied to the center differential 3. Thus, the distribution of power to the front and rear wheels is controlled.

When it says that the clutch torque VTD0 is corrected based on the deviation $\Delta\gamma$ of the actual yaw rate $\gamma$ from the target yaw rate $\gamma$t, it means that the clutch torque is increased or decreased based on the deviation $\Delta\gamma$ that is presumably produced during turning of the vehicle. This is intended to prevent the vehicle from exhibiting the tendency toward oversteering or understeering.

Moreover, the clutch tightening force correction factor Ktr based on which a magnitude of control is finalized and which is set by the setting unit 90 assumes five values associated with five tightening levels of level 1 to level 5. The value associated with level 3 shall be 1.0. The value associated with level 1 shall be 0.5 (that causes the clutch to be released), and the value associated with level 2 shall be 0.8 (that causes the clutch to be slightly released). The value associated with level 4 shall be 1.2 (that causes the clutch to be slightly tightened), and the value associated with level 5 shall be 1.5 (that causes the clutch to be tightened). If the basic clutch tightening force FOtb resulting from multiplication by the clutch tightening force correction factor Ktr exceeds a setting limit that is the largest value capable of being set for the transfer clutch 21, the final basic clutch tightening force FOtb is limited to the setting limit value.

The values the clutch tightening force correction factor Ktr assumes are set in the setting unit 90 while being associated with the tightening levels for a limited slip differential in a four wheel drive vehicle which are listed in Table 1. The values the clutch tightening force correction factor Ktr assumes are set based on the situation and shape of the road, on which the vehicle is driven, through experiments and calculations so that the action of the front-rear traction distribution control unit 50 will be balanced with the actions of the other vehicle behavior control units 60, 70, and 80 that are mounted in the vehicle.

Table 1 lists an example of the concrete magnitudes of the control by which the plurality of the vehicle behavior control units acts and the sensibilities of the vehicle behavior control units in intervening in the associated control actions.

TABLE 1

| No. | Road | Curving or not | Climbing or Descending | Tightening level for a limited slip differential a 4WD vehicle | Sensibility in intervening in an ABS action | Sensibility in intervening in a TCS action | Sensibility in intervening in a VDC-O action | Sensibility in intervening in a VDC-V action |
|---|---|---|---|---|---|---|---|---|
| 1 | Snowy Road | Curving | Horizontal | 4 | 3 | 3 | 2 | 3 |
| 2 | | | Climbing | 5 | 4 | 4 | 3 | 3 |
| 3 | | | Descending | 5 | 2 | 2 | 1 | 1 |
| 4 | | Not curving | Horizontal | 4 | 3 | 3 | 2 | 3 |
| 5 | | | Climbing | 5 | 4 | 4 | 3 | 3 |
| 6 | | | Descending | 5 | 4 | 3 | 1 | 1 |
| 7 | Dirt Road | Curving | Horizontal | 3 | 4 | 5 | 3 | 3 |
| 8 | | | Climbing | 4 | 4 | 5 | 4 | 4 |
| 9 | | | Descending | 4 | 5 | 4 | 3 | 2 |
| 10 | | Not curving | Horizontal | 3 | 4 | 5 | 3 | 3 |
| 11 | | | Climbing | 4 | 4 | 5 | 4 | 4 |
| 12 | | | Descending | 4 | 5 | 4 | 3 | 2 |
| 13 | Wet Paved Road | Curving | Horizontal | 2 | 3 | 4 | 3 | 3 |
| 14 | | | Climbing | 3 | 3 | 5 | 4 | 4 |
| 15 | | | Descending | 3 | 3 | 4 | 2 | 3 |
| 16 | | Not curving | Horizontal | 2 | 3 | 4 | 3 | 3 |
| 17 | | | Climbing | 3 | 3 | 5 | 4 | 4 |
| 18 | | | Descending | 3 | 3 | 4 | 2 | 3 |
| 19 | Dry Paved Road | Curving | Horizontal | 1 | 3 | 4 | 3 | 4 |
| 20 | | | Climbing | 2 | 3 | 5 | 4 | 4 |
| 21 | | | Descending | 2 | 3 | 4 | 3 | 3 |
| 22 | | Not curving | Horizontal | 1 | 3 | 4 | 3 | 4 |
| 23 | | | Climbing | 2 | 3 | 5 | 4 | 4 |
| 24 | | | Descending | 2 | 3 | 4 | 3 | 3 |

Moreover, the anti-lock brake control unit 60 calculates, for example, each wheel speed, accelerations, a pseudo vehicle speed. Herein, the pseudo vehicle speed is a value calculated by decreasing an initial value at a rate equivalent to a predetermined deceleration. The initial value is the value of a wheel speed attained when the brake pedal is stepped on and the vehicle speed is decreased at a value equal to or larger than a predetermined value, that is, when the vehicle is fully braked. The pseudo vehicle speed is compared with each wheel speed. Based on the result of the comparison and the accelerations at which the wheel is accelerated, any of three hydraulic modes; a boost mode, a retention mode, and a decompression mode is selected for an antilock braking system (ABS) to be activated.

Specifically, when a difference between the pseudo vehicle speed and each wheel speed is larger than a preset criterion of a skid to be prevented by the antilock braking system (ABS), the wheel skids. At this time, the braking pressure generated this time shall be referred to as the predictive pressure causing the ABS to act. The braking pressure is decreased to a predetermined value, retained at the predetermined value, and then increased again to the predictive pressure causing the ABS to act. When the wheel thus skids again, the braking pressure is decreased again. This cycle is repeated. The anti-lock brake control unit 60 then outputs a selected predetermined brake control signal to the hydraulic unit for brake 25.

The criterion of a skid to be prevented by the ABS is multiplied by an ABS sensibility correction factor KABS set by the setting unit 90, and thus finally determined. That is to say, the ABS sensibility correction factor KABS is a determinant of the sensibility of the anti-lock brake control unit 60 in intervening in the action of the ABS. For example, the ABS sensibility correction factor KABS assumes five values associated with five sensibility levels of level 1 to level 5. The value associated with level 3 shall be 1.0. The value associated with level 1 shall be 0.8 (that makes the anti-lock brake control unit sensitive), and the value associated with level 2 shall be 0.9 (that makes the anti-lock brake control unit little sensitive). The value associated with level 4 shall be 1.1 (that makes the anti-lock brake control unit little insensitive), and the value associated with level 5 shall be 1.2 (that makes the anti-lock brake control unit insensitive).

The values the ABS sensibility correction factor KABS assumes are set in the setting unit 90 while being associated with the levels of sensibility in intervening in the ABS action listed in Table 1. The values are determined based on the situation and shape of the road, on which the vehicle is driven, through experiments and calculations so that the action of the anti-lock brake control unit 60 will be balanced with the actions of the other vehicle behavior control units 50, 70, and 80 that are mounted in the vehicle.

Moreover, the traction control unit 70 detects a slip ratio of each wheel by receiving a signal from an associated one of the wheel speed sensors 31$fl$, 31$fr$, 31$rl$, and 31$rr$. When the slip ratio is equal to or larger than a preset criterion of a slip ratio, the traction control unit 70 outputs a predetermined control signal to the engine control unit 71 and thus instructs the engine control unit 71 to decrease the torque to be exerted by the engine 1.

The criterion of the slip ratio is multiplied by a TCS sensibility correction factor KTCS set by the setting unit 90, and thus finally determined. Namely, the TCS sensibility correction factor KTCS is a determinant of the sensibility of the traction control unit 70 in intervening in the action of the engine control unit 71. For example, the TCS sensibility correction factor KTCS assumes five values associated with five sensibility levels of level 1 to level 5. The value associated with level 3 shall be 1.0. The value associated with level 1 shall be 0.8 (that makes the traction control unit sensitive), and the value associated with level 2 shall be 0.9 (that makes the traction control unit little sensitive). The value associated with level 4 shall be 1.1 (that makes the traction control unit little insensitive), and the value associated with level 5 shall be 1.2 (that makes the traction control unit insensitive).

The values the TCS sensibility correction factor KTCS assumes are set in the setting unit 90 while being associated with the levels of sensibility in intervening in the TCS action listed in Table 1. Specifically, the values are determined based on the situation and shape of the road, on which the vehicle is driven, through experiments and calculations so that the action of the traction control unit will be balanced with the actions of the other vehicle behavior control units 50, 60, and 80 that are mounted on the vehicle.

Figure 4:
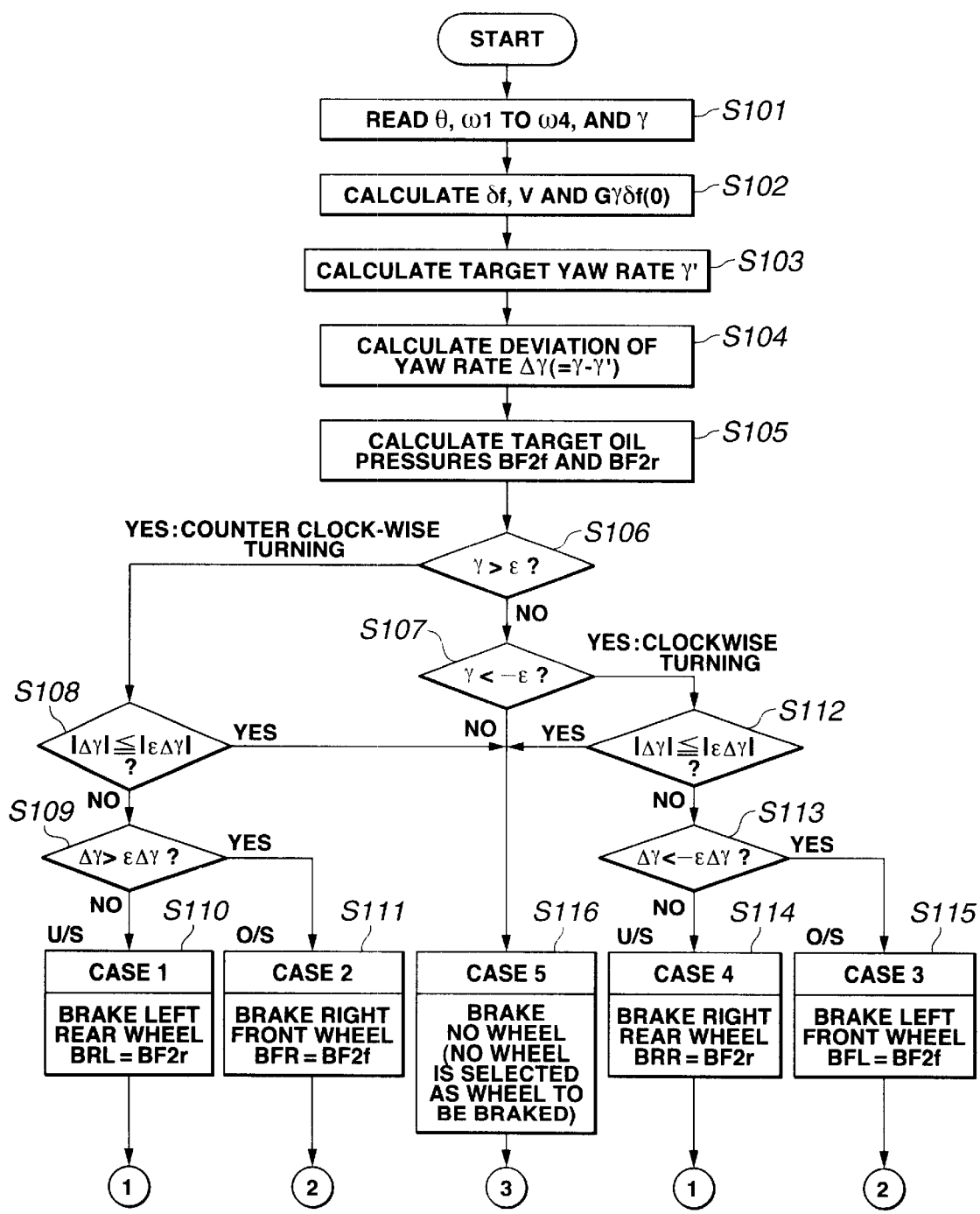
FIG. 4 is a flowchart describing a driving force control sequence.
Figure 5:
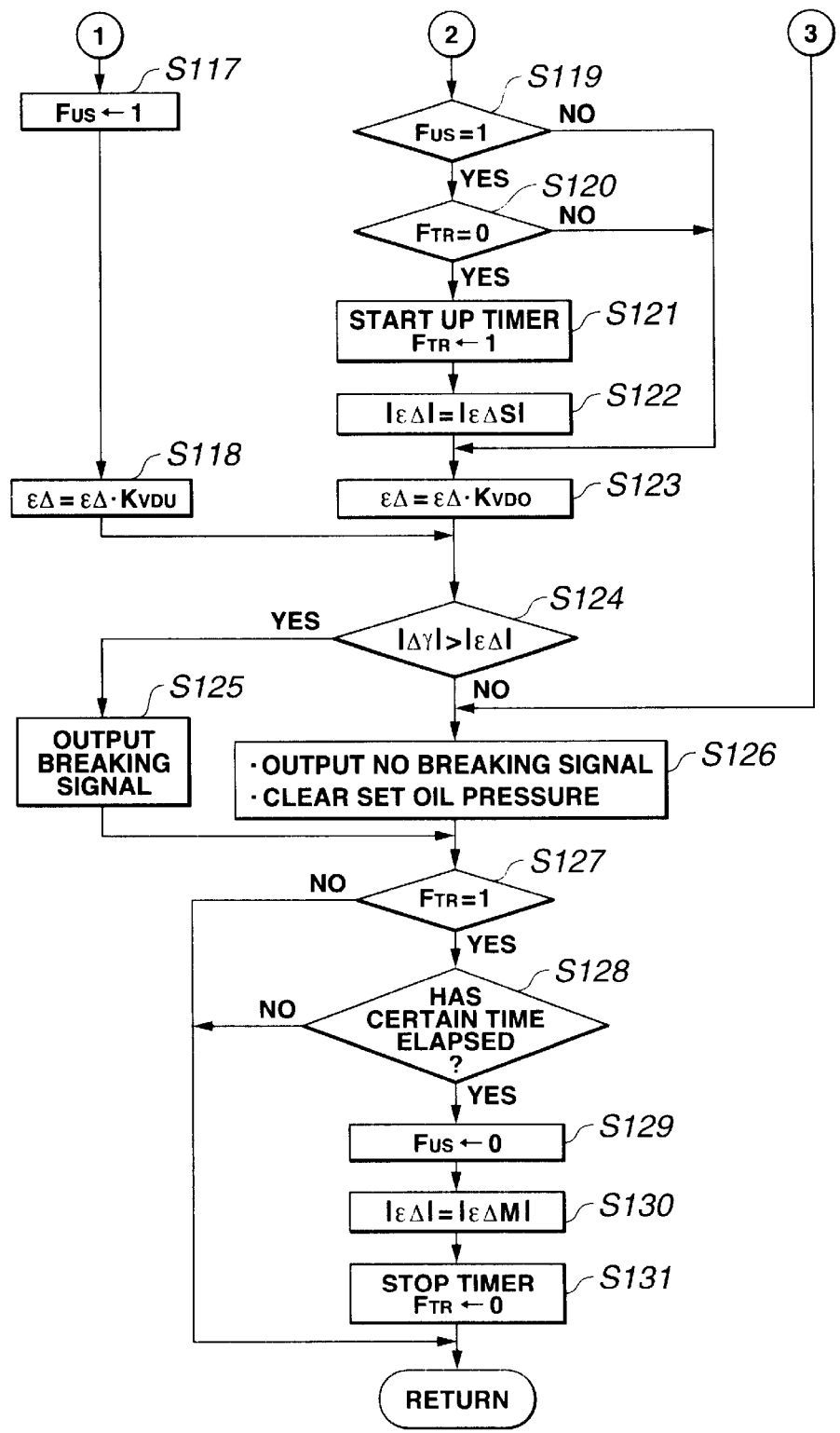
FIG. 5 is a flowchart describing a continuation of the driving force control sequence described in FIG. 4.
Figure 6:
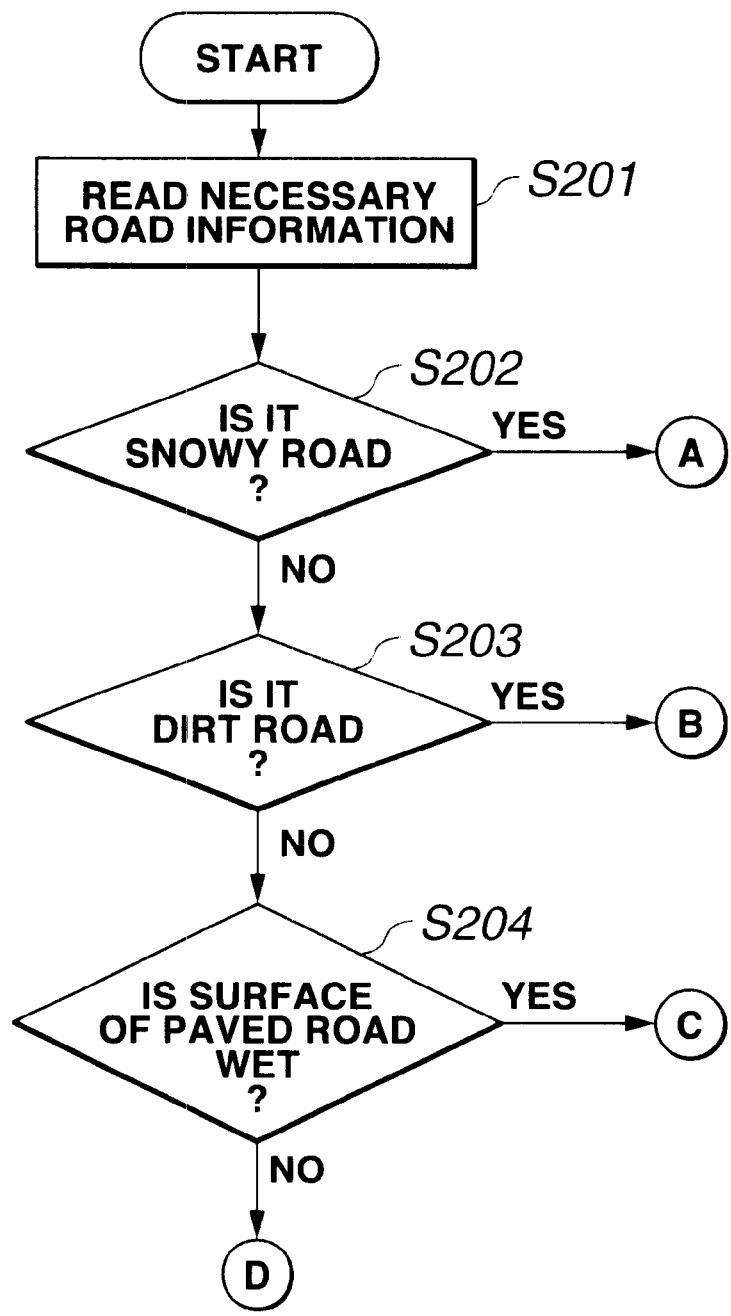
FIG. 6 is a flowchart describing a sequence of setting correction factors for vehicle behavior control units.
Figure 7:
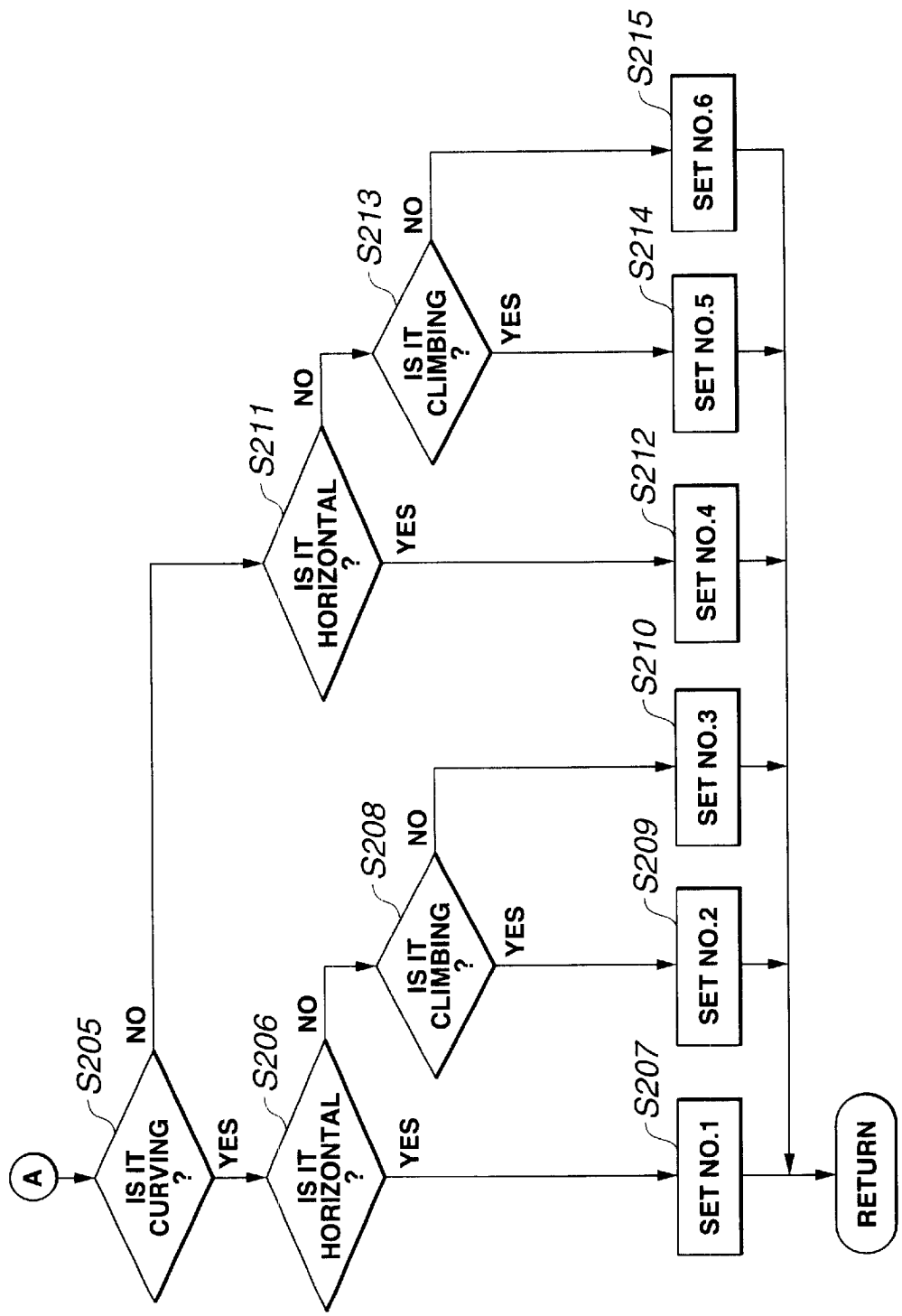
FIG. 7 is a flowchart describing a continuation of the sequence of setting correction factors described in FIG. 6.
Figure 8:
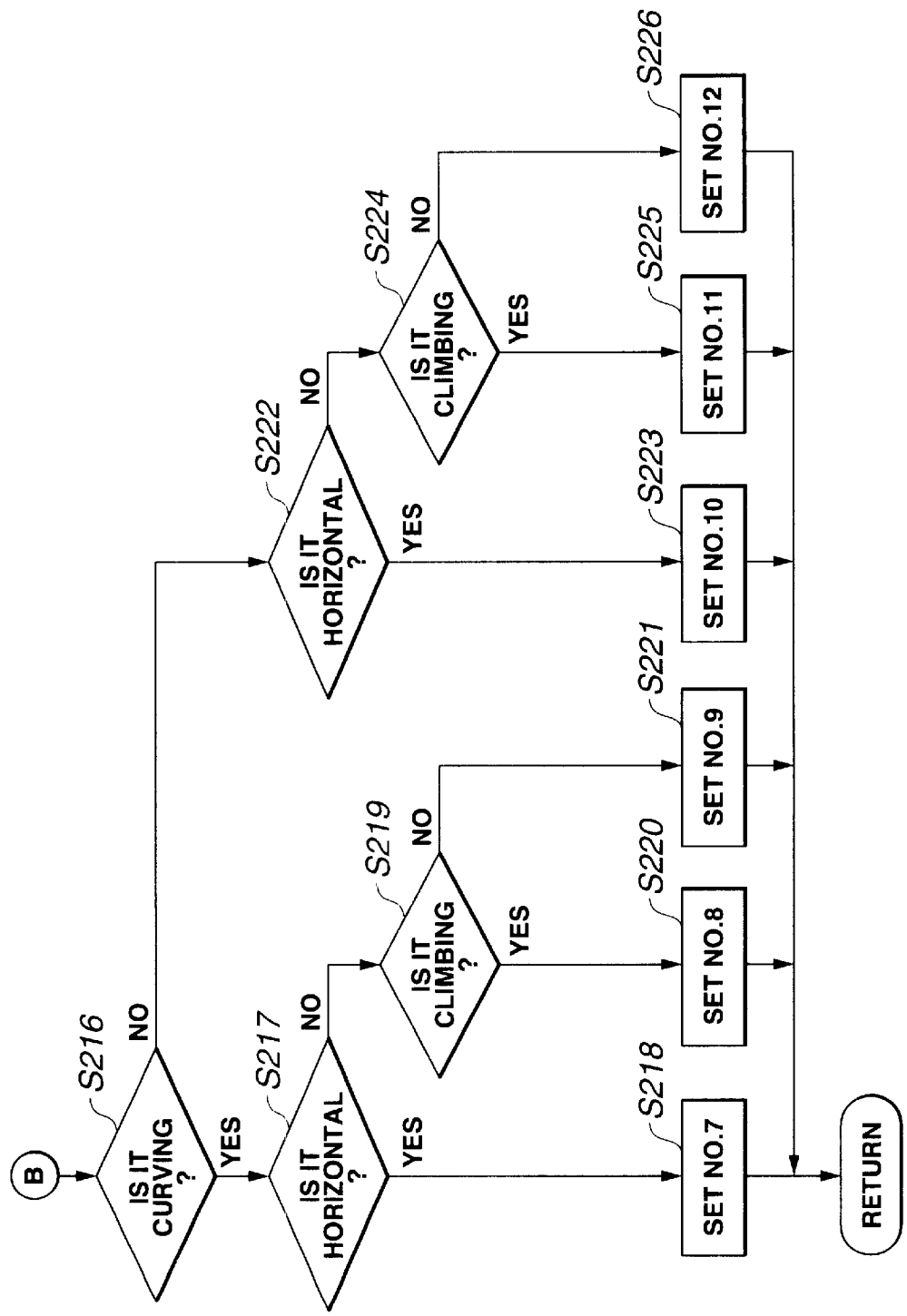
FIG. 8 is a flowchart describing a continuation of the sequence of setting correction factors described in FIG. 6.
Figure 9:
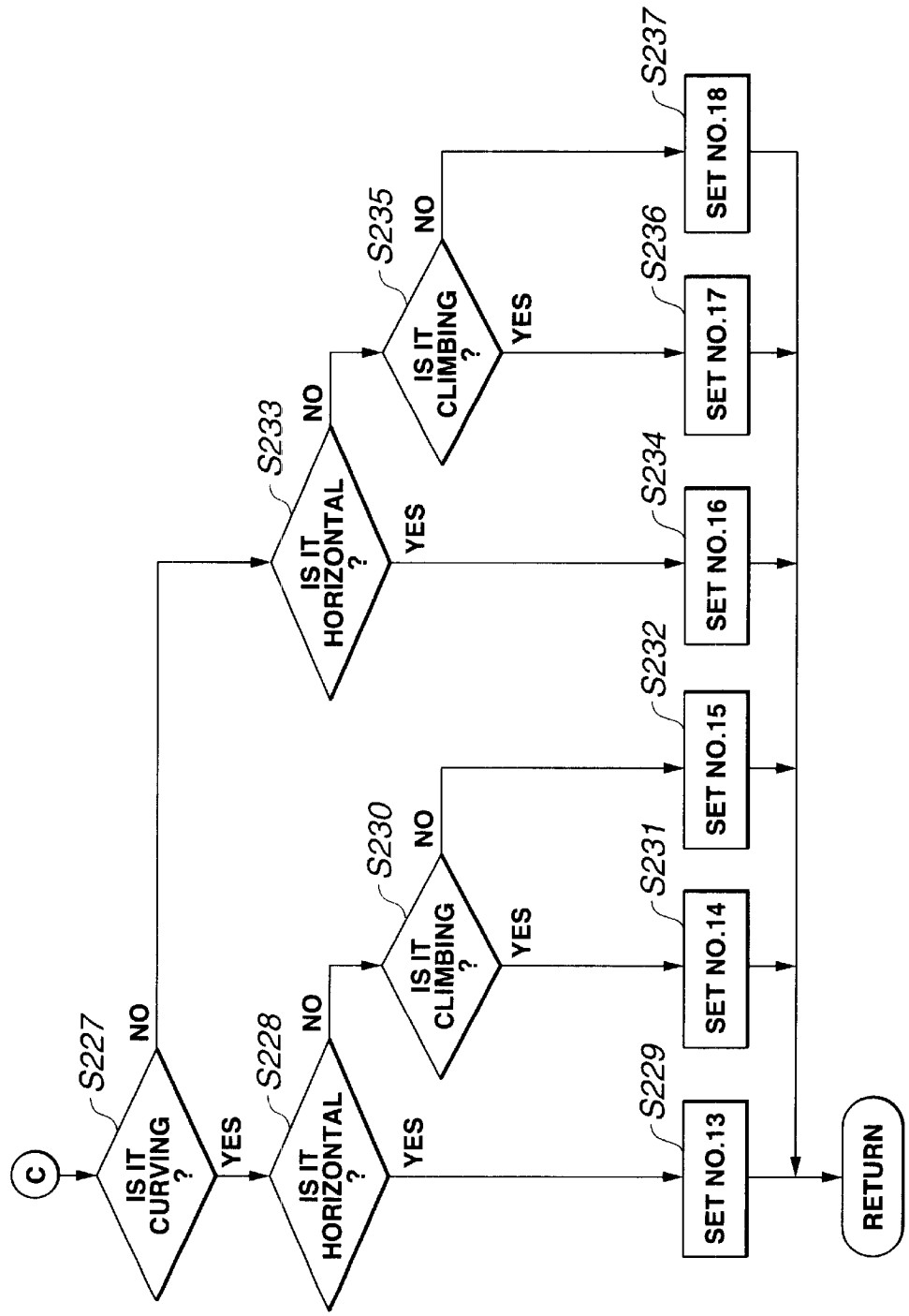
FIG. 9 is a flowchart describing a continuation of the sequence of d setting correction factors described in FIG. 6.
Figure 10:
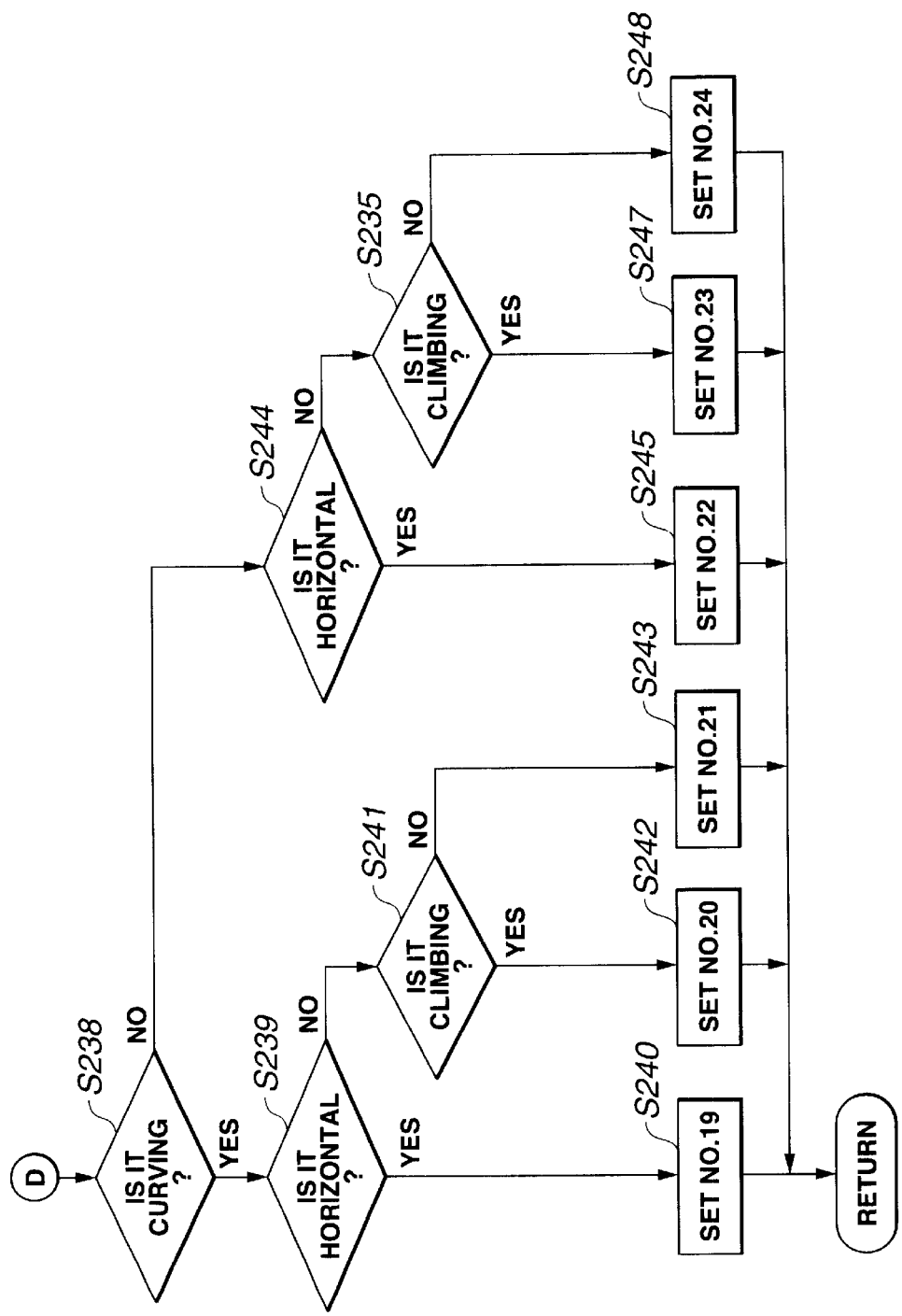
FIG. 10 is a flowchart describing a continuation of the sequence of setting correction factors described in FIG. 6.

Now, the braking power control unit 80 controls the action of a vehicle directional control (VDC) system according to an art disclosed in Japanese Unexamined Patent Application Publication No. 9-66823 filed by the present assignee. A braking power control program that describes instructions to be followed by the braking power control unit 80 will be described referring to the flowcharts of FIGS. 4 and 5. The braking force control program is run at an interval of a predetermined time (for example, 10 ms) while the vehicle is driven. When the braking force control program is activated, the steering wheel angle θH is read from the steering wheel angle sensor 32, the wheel speeds are read from the wheel speed sensors 31$fl$, 31$fr$, 31$rl$, and 31$rr$, and the actual yaw rate y is read from the yaw rate sensor 33 at step (hereinafter referred to as S) 101. The control is then passed to S102.

At S102, a steer angle δf (=θ/N) is calculated from the steering wheel angle θH, and a vehicle speed V is calculated from the wheel speeds. Moreover, a steady-state gain to be given to a yaw rate Gγδf(0) is calculated as follows:

$$G\gamma\delta f(0)=1/(1+A0\cdot V^2)\cdot(V/L)$$

where A0 denotes a stability factor for the vehicle, and L denotes a wheel base. Herein, m denotes the mass of the vehicle, Lf denotes a distance between the front driving axle and the center of gravity, and Lr denotes a distance between the rear driving axle and the center of gravity. CPf denotes a front equivalent cornering power, and CPr denotes a rear equivalent cornering power. In this case, the stability factor A0 is expressed as follows:

$$A0=(-m\cdot(Lf\cdot CPf-Lr\cdot CPr))/(2\cdot L^2\cdot CPf\cdot CPr)$$

Thereafter, the control is passed to S103. A target yaw rate γ' is calculated according to the following formula:

$$\gamma'=1/(1+T\cdot s)\cdot G\gamma\delta f(0)\cdot\delta f$$

where T denotes a time constant. For example, T is given as (m·Lf·V)/(2·L·CPr). Moreover, s denotes a Laplace's operator.

Thereafter, the control is passed to S104 of the program. The deviation Δγ (=γ−γ') is calculated. The control is then passed to S105. The target oil pressure for the front wheels, BF2f, and the target oil pressure for the rear wheels, BF2r, are calculated according to the following formulas:

$$BF2f=G1\cdot(\Delta A\cdot 4\cdot L^2\cdot CPf\cdot CPr\cdot V)/((CPf+CPr)/df)\cdot\gamma$$

$$BF2r=G1\cdot(\Delta A\cdot 4\cdot L^2\cdot CPf\cdot CPr\cdot V)/((CPf+CPr)/dr)\cdot\gamma$$

where G1 denotes a gain, df denotes the area of the tread of each front wheel, and dr denotes the area of the tread of each rear wheel. ΔA is expressed as follows:

$$\Delta A = (\delta f/(G\gamma \delta f(0) \cdot \delta f + \Delta\gamma) - 1/G\gamma \delta f(0))/L \cdot V$$

Thereafter, the control is passed to S106 of the program. It is judged whether the actual yaw rate γ is larger than a value ε, that is, whether the vehicle is turned counterclockwise along a rather large circle. If the actual yaw rate γ is equal to or smaller than ε, the control is passed to S107. It is judged whether the actual yaw rate γ is smaller than −ε, that is, whether the vehicle is turned clockwise along a rather large circle.

If it is judged at S107 that the vehicle is not turned clockwise along a rather large circle, the actual yaw rate γ ranges from ε to −ε inclusive ε and −ε (that is, −ε≦γ≦ε). In this case, the kinetic state of the vehicle is substantially rectilinear. The control is then passed to S116. Consequently, a wheel to be braked is not selected and no wheel is braked.

Moreover, if it is judged at S106 that the actual yaw rate γ is larger than ε (that is, γ>ε), that is, that the vehicle is turned counterclockwise along a rather large circle, the control is passed to S108. It is then judged whether the deviation Δγ of the actual yaw rate meets the condition of $|\Delta\gamma| \leq |\epsilon\Delta\gamma|$ and is approximately 0. In other words, it is judged whether the vehicle exhibits the tendency toward substantially neutral steer. If it is judged at S108 that $|\Delta\gamma| \leq |\epsilon\Delta\gamma|$ is met and the vehicle exhibits the tendency toward substantially neutral steering position, the control is passed to step S116. In any other case (the vehicle exhibits the tendency toward understeering or oversteering), the control is passed to S109.

At S109, it is judged whether the vehicle exhibits the tendency toward understeering or oversteering, that is, whether Δγ<−εΔγ or Δγ>εΔγ is met. If Δγ<−εΔγ is met and the deviation Δγ of the actual yaw rate assumes a negative value unlike the actual yaw rate γ, it is judged that the deviation of the actual yaw rate from the target yaw rate γ' signifies the tendency toward the understeering. The control is passed to S110. If Δγ>εΔγ is met and the deviation Δγ of the actual yaw rate assumes a positive value like the actual yaw rate γ, it is judged that the deviation of the actual yaw rate γ from the target yaw rate γ' signifies the tendency toward the oversteering. The control is then passed to S111.

When the control is passed from S109 of the program to S110 thereof, the left rear wheel 4rl is selected as a wheel to be braked with the target oil pressure for a rear wheel, BF2r, calculated at S105 (oil pressure for the left rear wheel BRL=BF2r). When the control is passed from S109 of the program to S111 thereof, the right front wheel 4fr is selected as a wheel to be braked with the target oil pressure BF2f for a front wheel calculated at S105 (oil pressure for the right front wheel BFR=BF2f).

If it is judged at S107 that γ<−ε is met and the vehicle is turned clockwise along a rather large circle, the control is passed to S112. It is then judged whether the deviation Δγ of the actual yaw rate meets the condition of $|\Delta\gamma| \leq |\epsilon\Delta\gamma|$ and is approximately 0, that is, whether the vehicle exhibits the tendency substantially the neutral steering.

If it is judged at S112 that $|\Delta\gamma| \leq |\epsilon\Delta\gamma|$ is met and the vehicle exhibits the tendency toward substantially neutral steer, the control is passed to S116. In any other case (the vehicle exhibits the tendency toward understeer or oversteer), the control is passed to S113.

This S113 is a step of judging whether the vehicle exhibits the tendency toward the understeering or oversteering. It is therefore judged whether Δγ>εγ is met or Δγ<−εΔγ is met. If Δγ>εΔγ is met and the deviation Δγ of the actual yaw rate assumes a positive value unlike the actual yaw rate γ, it is judged that the deviation Δγ of the actual yaw rate γ from the target yaw rate γ' signifies the tendency toward understeer. The control is then passed to S114. If Δγ<−εΔγ is met and the deviation Δγ of the actual yaw rate assumes a negative value like the actual yaw rate γ, it is judged that the deviation Δγ of the actual yaw rate γ from the target yaw rate γ' signifies the tendency toward oversteer. The control is then passed to S115.

When the control is passed from S113 to S114, the right rear wheel 4rr is selected as a wheel to be braked with the target oil pressure for a rear wheel, BF2r calculated at S105, (oil pressure for the right rear wheel BRR=BF2r). When the control is passed from S113 to S115, the left front wheel 4fl is selected as a wheel to be braked with the target oil pressure for the front wheel, BF2f calculated at S105, (oil pressure for the left front wheel BFL=BF2f). When the control is passed from S107, S108, or S112 to S116, a wheel to be braked is not selected and no wheel is braked.

If processing to cope with the tendency toward the understeering (selection of a wheel to be braked and setting of oil pressure) is performed at S110 or S114 of the program, the control is passed to S117. If processing to cope with the tendency toward the oversteering (selection of the wheel to be braked and setting of the oil pressure) is performed at S111 or S115, the control is passed to S119. Otherwise, the control is passed from S116 to S126.

If processing to cope with the tendency toward the understeering (selection of a wheel to be braked and setting of the oil pressure) is performed at S110 or S114, the control is passed to S117. An understeering passage flag FUS is then set (to represent 1). The understeering passage flag FUS is a flag indicating that the vehicle is driven to exhibit the tendency toward the understeering. The understeering passage flag FUS is cleared (reset to represent 0) when the time set in a threshold setting timer has elapsed.

Thereafter, the control is passed to S118. A threshold serving as a criterion, that is, a criterion threshold εΔ is multiplied by an understeering VDC sensibility correction factor KVDU that is set by the setting unit 90. The control is then passed to S124. The criterion threshold εΔ is normally set to a first threshold εΔM. As described later, when the behavior of the vehicle changes from the tendency toward the understeering to the tendency toward the oversteering, the time preset in the timer, that is, a second threshold εΔS is set as the criterion threshold εΔ. The first threshold εΔM and the second threshold εΔS assume positive values previously obtained through experiments or calculations. The thresholds used to judge the deviation Δγ of the actual yaw rate have the relationships of $|\epsilon\Delta M| > |\epsilon\Delta S| > |\epsilon\Delta\gamma|$. The larger the absolute values are, the poorer the sensibility of the braking power control unit is.

Moreover, the understeering VDC sensibility correction factor KVDU is a determinant of the sensibility of the braking power control unit in intervening in the action of the vehicle directional control (VDC) system that is performed in order to cope with the tendency of the vehicle toward the understeering. The understeering VDC sensibility correction factor KVDU assumes five values associated with five sensibility levels of level 1 to level 5. The value associated with level 3 shall be 1.0. The value associated with level 1 shall be 0.8 (that makes the braking power control unit sensitive), and the value associated with level 2 shall be 0.9 (that makes the braking power control unit little sensitive). The value associated with level 4 shall be 1.1 (that makes the braking power control unit little insensitive), and the value associated with level 5 shall be 1.2 (that makes the braking power control unit insensitive). The values the understeer VDC sensibility correction factor KVDU assumes are set in the setting unit 90 while being associated with the levels of sensibility in intervening in the VDC-U action listed in Table 1. Incidentally, the values are determined based on the situation and shape of the road, on which the vehicle 1 is driven, through experiments and calculations so that the action of the braking power control unit will be balanced with the actions of the other vehicle behavior control units 50, 60, and 70 that are previously mounted in the vehicle.

After processing to cope with the tendency toward oversteering (selection of a wheel to be braked and setting of the oil pressure) is performed at S111 or S115 of the program, the control is passed to S119. It is then judged whether the understeer passage flag FUS is set (to represent 1). If it is judged that the understeer passage flag FUS is set, that is, that the vehicle has been driven to exhibit the tendency toward understeer, the control is passed to S120. If the understeer passage flag FUS is reset, the control is jumped to S123. In general, before the vehicle exhibits the tendency toward the oversteering, the vehicle 1 exhibits the tendency toward the understeering. Therefore, if the tendency toward the understeering is changed to the tendency toward the oversteering, the understeering passage flag FUS is set. The control is then passed from S119 to S120. However, if the understeering passage flag FUS is reset because the time set in the threshold setting timer has elapsed, or if the vehicle exhibits the tendency toward the oversteering without exhibiting the tendency toward the understeering for some reason, the control is jumped to S123 of the program. Steps S120 to S122 are bypassed.

If it is judged at S119 that the flag FUS represents 1, the control is passed to S120. It is then judged whether a timer start flag FTR is reset (to represent 0). The timer start flag FTR is set (to represent 1) when the threshold setting time is started up. When the threshold setting timer is stopped, the timer start flag FTR is resetted (to represent 0).

If it is judged at S120 that the timer start flag FTR is reset (to represent 0) and that the threshold setting timer is stopped, the control is passed to S121 at which the threshold setting timer is started up. The threshold setting timer is then started up, and the timer start flag FTR is set. The control is then passed to S122. The criterion threshold $\epsilon\Delta$ is set to the second threshold $\epsilon\Delta S$. The control is then passed to S123.

If it is judged at S120 that the timer start flag FTR is set (to represent 1) and that the threshold setting timer is actuated, the control is jumped to processing of S123.

If it is judged at S119 that the flag FUS represents 0, or if it is judged at S120 that the flag FTR represents 1, the control is passed from S119, S120, or S122 to S123. The criterion threshold $\epsilon\Delta$ is multiplied by an oversteering VDC sensibility correction factor KVDO set by the setting unit 90. The control is then passed to S124.

The oversteering VDC sensibility correction factor KVDO is a determinant of the sensibility of the braking power control unit 80 in intervening in the action of the vehicle directional control (VDC) system that is performed to cope with the tendency of the vehicle toward the oversteering. The oversteering VDC sensibility correction factor KVDO assumes five values associated with five sensibility levels of level 1 to level 5. The value associated with level 3 shall be 1.0. The value associated with level 1 shall be 0.8 (that makes the braking power control unit sensitive), and the value associated with level 2 shall be 0.9 (that makes the braking power control unit little sensitive). The value associated with level 4 shall be 1.1 (that makes the braking power control unit little insensitive), and the value associated with level 5 shall be 1.2 (that makes the braking power control unit insensitive). The values the oversteering VDC sensibility correction factor KVDO assumes are set in the setting unit 90 while being associated with the levels of sensibility in intervening in the VDC-O action listed in Table 1. Incidentally, the values are determined based on the situation and shape of the road, on which the vehicle is driven, through experiments and calculations so that the action of the braking power control unit 80 will be balanced with the actions of the other vehicle behavior control units 50, 60, and 70 that are previously mounted in the vehicle.

When the control is passed from S118 or S123 to S124, the deviation $\Delta\gamma$ of the actual yaw rate is compared with the criterion threshold $\epsilon\Delta$ (the absolute values are compared with each other). If the deviation $\Delta\gamma$ of the actual yaw rate falls within a controllable range ($|\Delta\gamma|>|\epsilon\Delta|$), the control is passed to S125. A signal is outputted to the hydraulic unit for brake 25.

If it is judged at S124 that the deviation of the actual yaw rate falls within the controllable range, or if the control is passed from S110 to S117, the hydraulic unit for brake 25 generates a braking force corresponding to the oil pressure BRL=BF2r for the wheel cylinder 26rl. When the control is passed from S114 to S117, the hydraulic unit for brake 25 generates the braking force corresponding to the oil pressure BRR=BF2f for the wheel cylinder 26rr. Moreover, when the control is passed from S115 to S119, the hydraulic unit for brake 25 generates a braking force corresponding to the oil pressure BFR=BF2f for the wheel cylinder 26fr. Moreover, when the control is passed from S115 to S119, the hydraulic unit for brake 25 generates the braking force corresponding to the oil pressure BFL=BF2f for the wheel cylinder 26fl.

If it is judged at S124 that the deviation $\Delta\gamma$ of the actual yaw rate falls within an uncontrollable range ($|\Delta\gamma|\leq|\epsilon\Delta|$), or when the control is passed from S116, the control is passed to S126. No control signal is outputted, and a set value of the oil pressure is cleared.

After the processing of S125 or S126 is completed, the control is passed to S127. It is then judged whether the timer start flag FTR is set (whether the threshold setting timer is actuated).

If it is judged that the timer start flag FTR is resetted and the threshold setting timer is not actuated, the program is exited and the control is returned.

Moreover, if it is judged at S127 that the timer start flag FTR is set and that the threshold setting timer is actuated, the control is passed to S128. It is then judged whether a certain time has elapsed. If the certain time has not elapsed, the program is exited and the control is returned.

If it is judged at S128 that the certain time has elapsed, the understeer passage flag FUS is reset at S129. The criterion threshold $\epsilon\Delta$ is set to the first threshold $\epsilon\Delta M$ at S130. The threshold setting timer is stopped at S131, and the timer start flag FTR is reset. The program is exited and the control is returned.

As mentioned above, according to the present embodiment, the correction factor setting unit 90 is included as a control varying means that sets the correction factors according to the situation and shape of the road so that the actions of the vehicle behavior control units 50, 60, 70, and 80, which are mounted in the vehicle, will be balanced with each other. The correction factors include the clutch tightening force correction factor Ktr, ABS sensibility correction factor KABS, TCS sensibility correction factor KTCS, understeer VDC sensibility correction factor KVDU, and oversteer VDC sensibility correction factor KVDO.

Next, a control program that describes instructions to be followed by the setting unit 90 will be described in conjunction with the flowcharts of FIG. 6 to FIG. 10. The control program is run at an interval of a predetermined time while the vehicle is driven. When the program is activated, necessary road information is read from the road information recognizing unit 45 at S201. The necessary road information includes the situation of the road signifying the snowy road, the unpaved (a dirt) road, the wet paved road, or the dry paved road, and the shape of the road indicating whether the road is curved or not and whether the road is climbing (uphill), descending, or horizontal.

It is judged at S202 whether the situation of the road is snowy. If the road is snowy, the control is passed to S205 in FIG. 7. If the road is not snowy, the control is passed to S203. It is then judged whether the situation of the road is the dirt road. If it is judged at S203 that the road is the dirt road, the control is passed to S216 in FIG. 8. If the road is not the dirt road, the control is passed to S204. It is then judged whether the situation of the road is wet and paved. If it is judged at S204 that the road is a wet paved road, the control is passed to the processing of S227 in FIG. 9. If the road is not the wet paved road (but is a dry paved road or the like), the control is passed to processing of S238 in FIG. 10.

To begin with, if it is judged at S202 that the situation of the road is snowy, the control is passed to S205. It is then judged whether the shape of the road is curved. If the shape of the road is curved, the control is passed to S206. It is then judged whether the shape of the road is horizontal.

If it is judged at S206 that the shape of the road is horizontal, the control is passed to S207. The setting unit 90 sets correction factors, of which values are associated with sensibility levels listed in item number 1 in Table 1, for the vehicle behavior control units 50, 60, 70, and 80.

To be more specific, the clutch tightening force correction factor Ktr for the front-rear traction distribution control unit 50 is set to a value associated with level 4. The ABS sensibility correction factor KABS for the anti-lock brake control unit 60 is set to a value associated with level 3. The TCS sensibility correction factor for the traction control unit 70 is set to a value associated with level 3. The oversteer VDC sensibility correction factor KVDO or understeer VDC sensibility correction factor KVDU for the brake power control unit 80 is set to a value associated with level 2 or level 3, respectively. In the case of this kind of the road, especially when the vehicle skids, the vehicle must be immediately prevented from exhibiting the tendency toward the oversteering. Therefore, when the braking power control unit 80 is activated to cope with the tendency toward the oversteering, the setting unit 90 immediately activates the braking power control unit 80 so as to stabilize the behavior of the vehicle.

If it is judged at S206 that the shape of the road is not horizontal (flat), the control is passed to S208. It is then judged whether the shape of the road is climbing (uphill). If the shape of the road is climbing (uphill), the control is passed to S209. The setting unit 90 sets the correction factors, of which values are associated with the sensibility levels listed in item number 2 in Table 1, for the vehicle behavior control units 50, 60, 70, and 80.

Specifically, the clutch tightening force correction factor Ktr for the front-rear traction distribution control unit 50 is set to a value associated with level 5. The ABS sensibility correction factor KABS for the anti-lock brake control unit 60 is set to a value associated with level 4. The TCS sensibility correction factor KTCS for the traction control unit 70 is set to a value associated with level 4. The oversteering VDC sensibility correction factor KVDO or understeer VDC sensibility correction factor KVDU for the braking power control unit 80 is set to a value associated with level 3. Herein, the ABS sensibility correction factor KABS is associated with level 4, because when the road is climbing (uphill), the vehicle 1 decelerates with an accelerator pedal released and tacks in little, that is, the action of the antilock braking system (ABS) is stable. Moreover, the TCS sensibility correction factor KTCS is associated with level 4 and the oversteer VDC sensibility correction factor KVDO is associated with level 3. This is because when the vehicle is driven on a climbing (uphill) road with the accelerator pedal stepped on, a rather large skid should be permitted. Otherwise, the driver may have a feeling that something is wrong because of intervention by the traction control unit and braking power control unit.

Moreover, if it is judged at S208 that the road is not a climbing road (but a descending road), the control is passed to S209. The setting unit 90 sets the correction factors, of which values are associated with sensibility levels listed in item number 3 of Table 1, for the vehicle behavior control units 50, 60, 70, and 80, respectively.

Specifically, the clutch tightening force correction factor Ktr for the front-rear traction distribution control unit 50 is set to a value associated with level 5. The ABS sensibility correction factor KABS for the anti-lock brake control unit 60 is set to a value associated with level 2. The TCS sensibility correction factor KTCS for the traction control unit 70 is set to a value associated with level 2. The oversteer VDC sensibility correction factor KVDO or the understeering VDC correction factor KVDU for the braking power control unit 80 is set to a value associated with level 1. Herein, the ABS sensibility correction factor KABS is associated with level 2, because when the vehicle is driven on a descending road, the behavior of the vehicle tends to be unstable. Moreover, the TCS sensibility correction factor KTCS is associated with level 2 in order to prevent especially the rear wheels from skidding. Furthermore, the oversteer VDC sensibility correction factor KVDO or the understeering VDC sensibility correction factor KVDU for the braking power control unit 80 is associated with level 1 in order to prevent the behavior of the vehicle from being unstable despite the conditions for drive under which a vehicle is likely to behave in an unstable manner.

If it is judged at S205 that the shape of the road is not curved, the control is passed to S211. It is then judged whether the shape of the road is horizontal (flat).

If it is judged at S211 that the shape of the road is horizontal, the control is passed to S212. The setting unit 90 sets the correction factors, of which values are associated with the sensibility levels listed in item number 4 in Table 1, for the vehicle behavior control units 50, 60, 70, and 80, respectively.

Similarly to when the correction factors assume values associated with the sensibility levels listed in item number 1, the clutch tightening force correction factor Ktr for the front-rear traction distribution control unit 50 is set to a value associated with level 4. The ABS sensibility correction factor KABS for the anti-lock brake control unit 60 is set to a value associated with level 3. The TCS sensibility correction factor KTCS for the traction control unit 70 is set to a value associated with level 3. The oversteer VDC sensibility correction factor KVDO or understeer VDC sensibility correction factor KVDU for the braking power control unit 80 is set to a value associated with level 2 or level 3, respectively.

Moreover, if it is judged at S211 that the shape of the road is not horizontal, the control is passed to S213. It is then judged whether the road is the climbing (uphill) road. If the road is the climbing (uphill) road, the control is passed to S214. The setting unit 90 sets the correction factors, of which values are associated with the sensibility levels listed in item number 5 in Table 1, for the vehicle behavior control units 50, 60, 70, and 80, respectively.

Similarly to when the correction factors assume values associated with the sensibility levels listed in item number 2, the clutch tightening force correction factor Ktr for the front-rear traction distribution control unit 50 is set to a value associated with level 5. The ABS sensibility correction factor KABS for the anti-lock brake control unit 60 is set to a value associated with level 4. The TCS sensibility correction factor KTCS for the traction control unit 70 is set to a value associated with level 4. The oversteering VDC sensibility correction factor KVDO or the understeering VDC sensibility correction factor KVDU for the braking power control unit 80 is set to a value associated with level 3.

If it is judged at S213 that the road is not a climbing (uphill) road (but a descending road), the control is passed to S215. The setting unit 90 sets the correction factors, of which values are associated with the sensibility levels listed in item number 6 in Table 1, for the vehicle behavior control units 50, 60, 70, and 80, respectively.

Specifically, the clutch tightening force correction factor Ktr for the front-rear traction distribution control unit 50 is set to a value associated with level 5. The ABS sensibility correction factor KABS for the anti-lock brake control unit 60 is set to a value associated with level 4. The TCS sensibility correction factor KTCS for the traction control unit 70 is set to a value associated with level 3. The oversteering VDC sensibility correction factor KVDO or the understeering VDC sensibility correction factor KVDU for the braking power control unit 80 is set to a value associated with level 1. Herein, the ABS sensibility correction factor KABS is associated with level 4, because the behavior of the vehicle driven on a descending road is more likely to get unstable than that on a curved road. Moreover, the TCS sensibility correction factor KTCS is associated with level 3, because the behavior of the vehicle is more likely to get unstable that that on a curved road, though the rear wheels of the vehicle tend to skid on the curved road.

If it is judged at S203 that the situation of the road is the dirt road, the control is passed to S216. It is then judged whether the shape of the road is curved. If the shape of the road is curved, the control is passed to S217. It is then judged whether the shape of the road is horizontal.

If it is judged at S217 that the shape of the road is horizontal (flat), the control is passed to S218. The setting unit 90 sets the correction factors, of which values are associated with the sensibility levels listed in item number 7 in Table 1, for the vehicle behavior control units 50, 60, 70, and 80, respectively.

Specifically, the clutch tightening force correction factor Ktr for the front-rear traction distribution control unit 50 is set to a value associated with level 3. The ABS sensibility correction factor KABS for the anti-lock brake control unit 60 is set to a value associated with level 4. The TCS sensibility correction factor KTCS for the traction control unit 70 is set to a value associated with level 5. The oversteering VDC sensibility correction factor KVDO or the understeering VDC sensibility correction factor KVDU for the braking power control unit 80 is set to a value associated with level 3. Herein, the TCS sensibility correction factor KTCS is associated with level 5. This is because if the traction control unit sensitively intervenes in the action of the engine control unit responsively to the skid caused by the irregularity of the road, the driver will have an intense feeling that something is wrong.

If it is judged at S217 that the shape of the road is not horizontal, the control is passed to S219. It is then judged whether the road is a climbing (uphill) road. If the road is the climbing (uphill) road, the control is passed to S220. The setting unit 90 sets the correction factors, of which values are associated with the sensibility levels listed in item number 8 in Table 1, for the vehicle behavior control units 50, 60, 70, and 80, respectively.

Specifically, the clutch tightening force correction factor Ktr for the front-rear traction distribution control unit 50 is set to a value associated with level 4. The ABS sensibility correction factor KABS for the anti-lock brake control unit 60 is set to a value associated with level 4. The TCS sensibility correction factor KTCS for the traction control unit 70 is set to a value associated with level 5. The oversteering VDC sensibility correction factor KVD or the understeering VDC sensibility correction factor KVDU for the braking power control unit 80 is set to a value associated with level 4. Herein, the oversteer VDC sensibility correction factor KVDO or understeer VDC sensibility correction factor KVDU for the braking power control unit 80 is associated with level 4. This is because if the braking power control unit sensitively intervenes in the action of the vehicle directional control system responsively to a yaw caused by the irregularity of the road, the driver may have an intense feeling that something is wrong.

If it is judged at S219 that the road is not a climbing (uphill) road (but a descending road), the control is passed to S221. The setting unit 90 sets the correction factors, of which values are associated with the sensibility levels listed in item number 9 in Table 1, for the vehicle behavior control units 50, 60, 70, and 80, respectively.

Specifically, the clutch tightening force correction factor Ktr for the front-rear traction distribution control unit 50 is set to a value associated with level 4. The ABS sensibility correction factor KABS for the anti-lock brake control unit 60 is set to a value associated with level 5. The TCS sensibility correction factor KTCS for the traction control unit 70 is set to a value associated with level 4. The oversteer VDC sensibility correction factor KVDO or the understeering VDC sensibility correction factor KVDU for the braking power control unit 80 is set to a value associated with level 3 or level 2, respectively. Herein, the ABS sensibility correction factor KABS is associated with level 5 in order to reduce a stopping distance. Moreover, the TCS sensibility correction factor KTCS is associated with level 4, because when the vehicle is driven with the accelerator pedal released, the vehicle does not skid.

Moreover, if it is judged at S216 that the shape of the road is not curved, the control is passed to S222. It is judged whether the shape of the road is horizontal (flat).

If it is judged at S222 that the shape of the road is horizontal (flat), the control is passed to S223. The setting unit 90 sets the correction factors, of which values are associated with the sensibility levels listed in item number 10 in Table 1, for the vehicle behavior control units 50, 60, 70, and 80, respectively.

Similarly to when the correction factors assume values associated with the sensibility levels listed in item number 7, the clutch tightening force correction factor Ktr for the front-rear traction distribution control unit 50 is set to a value associated with level 3. The ABS sensibility correction factor KABS for the anti-lock brake control unit 60 is set to a value associated with level 4. The TCS sensibility correction factor KTCS for the traction control unit 70 is set to a value associated with level 5. The oversteering VDC sensibility correction factor KVDO or the understeering VDC sensibility correction factor KVDU for the braking power control unit 80 is set to a value associated with the level 3.

If it is judged at S222 that the shape of the road is not horizontal (flat), the control is passed to S224. It is then judged whether the road is a climbing (uphill) road. If it is judged that the road is the climbing (uphill) road, the control is passed to S225. The setting unit 90 sets the correction factors, of which values are associated with the sensibility levels listed in item number 11 in Table 1, for the vehicle behavior control units 50, 60, 70, and 80, respectively.

Similarly to when the correction factors assume values associated with the sensibility levels listed in item number 8, the clutch tightening force correction factor Ktr for the front-rear traction distribution control unit 50 is set to a value associated with level 4. The ABS sensibility correction factor KABS for the anti-lock brake control unit 60 is set to a value associated with the level 4. The TCS sensibility correction factor KTCS for the traction control unit 70 is set to a value associated with the level 5. The oversteering VDC sensibility correction factor KVDO or the understeering VDC sensibility correction factor KVDU for the braking power control unit 80 is set to a value associated with the level 4.

If it is judged at S224 that the road is not a climbing (uphill) road (but a descending road), the control is passed to S226. The setting unit 90 sets the correction factors, of which values are associated with the sensibility levels listed in item number 12 in Table 1, for the vehicle behavior control units 50, 60, 70, and 80, respectively.

Specifically, similarly to when the correction factors assume values associated with the sensibility levels listed in item number 9, the clutch tightening force correction factor Ktr for the front-rear traction distribution control unit 50 is set to a value associated with the level 4. The ABS sensibility correction factor KABS for the anti-lock brake control unit 60 is set to a value associated with level 5. The TCS sensibility correction factor KTCS for the traction control unit 70 is set to a value associated with the level 4. The oversteering VDC sensibility correction factor KVDO or the understeering VDC sensibility correction factor KVDU for the braking power control unit 80 is set to a value associated with level 3 or level 2, respectively.

In contrast, if it is judged at S204 that the situation of the road is wet and paved, the control is passed to S227. It is then judged whether the shape of the road is curved. If the shape of the road is curved, the control is passed to S228. It is then judged whether the shape of the road is horizontal.

If it is judged at S228 whether the shape of the road is horizontal (flat), the control is passed to S229. The setting unit 90 sets the correction factors, of which values are associated with the sensibility levels listed in item number 13 in Table 1, for the vehicle behavior control units 50, 60, 70, and 80, respectively.

Specifically, the clutch tightening force correction factor Ktr for the front-rear traction distribution control unit 50 is set to a value associated with level 2. The ABS sensibility correction factor KABS for the anti-lock brake control unit 60 is set to a value associated with the level 3. The TCS sensibility correction factor KTCS for the traction control unit 70 is set to a value associated with the level 4. The oversteering VDC sensibility correction factor KVDO or the understeering VDC sensibility correction factor KVDU for the braking power control unit 80 is set to a value associated with the level 3. Herein, the TCS sensibility correction factor KTCS is associated with the level 4, because the vehicle is more stable on the wet paved road than on the snowy road. Therefore, the skid of the vehicle is permitted in order to suppress the driver's feeling that something is wrong.

If it is judged at S228 that the shape of the road is not horizontal (flat), the control is passed to S230. It is then judged whether the road is the climbing (uphill) road. If the road is the climbing (uphill) road, the control is passed to S231. The setting unit 90 sets the correction factors, of which values are associated with the sensibility levels listed in item number 14 in Table 1, for the vehicle behavior control units 50, 60, 70, and 80, respectively.

Specifically, the clutch tightening force correction factor Ktr for the front-rear traction distribution control unit 50 is set to a value associated with the level 3. The ABS sensibility correction factor KABS for the anti-lock brake control unit 60 is set to a value associated with the level 3. The TCS sensibility correction factor KTCS for the traction control unit 70 is set to a value associated with the level 5. The oversteering VDC sensibility correction factor KVDO or the understeering VDC sensibility correction factor KVDU for the braking power control unit 80 is set to a value associated with the level 4. Herein, the TCS sensibility correction factor KTCS is associated with the level 5, and the oversteering VDC sensibility correction factor KVDO or the understeering VDC sensibility correction factor KVDU for the braking power control unit 80 is associated with the level 4. This is because when the vehicle is driven on a climbing (uphill) road with the accelerator pedal stepped on, a rather large skid should be permitted. Otherwise, the driver may have the feeling that something is wrong due to too much intervention in the action of the engine control unit or in the action of the vehicle directional control system.

Moreover, if it is judged at S230 that the road is not a climbing (uphill) road (but a descending road), the control is passed to S232. The setting unit 90 sets the correction factors, of which values are associated with the sensibility levels listed in the item number 15 in the Table 1, for the vehicle behavior control units 50, 60, 70, and 80, respectively.

Specifically, the clutch tightening force correction factor Ktr for the front-rear traction distribution control unit 50 is set to a value associated with the level 3. The ABS sensibility correction factor KABS for the anti-lock brake control unit 60 is set to a value associated with the level 3. The TCS sensibility correction factor KTCS for the traction control unit 70 is set to a value associated with the level 4. The oversteering VDC sensibility correction factor KVDO or the understeering VDC sensibility correction factor KVDU for the braking power control unit 80 is set to a value associated with the level 2 or the level 3, respectively. Herein, the oversteering VDC sensibility correction factor KVDO is associated with the level 2 in order to prevent the vehicle from behaving in an unstable manner while being driven on the descending road.

Moreover, if it is judged at S227 that the shape of the road is not curved, the control is passed to S233. It is then judged whether the shape of the road is horizontal (flat).

If it is judged at S233 that the shape of the road is horizontal (flat), the control is passed to S234. The setting unit 90 sets the correction factors, of which values are associated with the sensibility levels listed in the item number 16 in the Table 1, for the vehicle behavior control units 50, 60, 70, and 80, respectively.

In this case, similarly to when the correction factors assume values associated with the sensibility levels listed in the item number 13, the clutch tightening force correction factor Ktr for the front-rear traction distribution control unit

50 is set to a value associated with the level 2. The ABS sensibility correction factor KABS for the anti-lock brake control unit 60 is set to a value associated with the level 3. The TCS sensibility correction factor KTCS for the traction control unit 70 is set to a value associated with the level 4. The oversteering VDC sensibility correction factor KVDO or the understeering VDC sensibility correction factor KVDU for the braking power control unit 80 is set to a value associated with the level 3.

In contrast, if it is judged at S233 that the shape of the road is not horizontal (flat), the control is passed to S235. It is then judged whether the road is the climbing (uphill) road. If it is judged that the road is a climbing (uphill) road, the control is passed to S236. The setting unit 90 sets the correction factors, of which values are associated with sensibility levels listed in the item number 17 in the Table 1, for the vehicle behavior control units 50, 60, 70, and 80, respectively.

In this case, similarly to when the correction factors assume values associated with the sensibility levels listed in the item number 14, the clutch tightening force correction factor Ktr for the front-rear traction distribution control unit 50 is set to a value associated with the level 3. The ABS sensibility correction factor KABS for the anti-lock brake control unit 60 is set to a value associated with the level 3. The TCS sensibility correction factor KTCS for the traction control unit 70 is set to a value associated with the level 5. The oversteering VDC sensibility correction factor KVDO or the understeering VDC sensibility correction factor KVDU for the braking power control unit 80 is set to a value associated with the level 4.

Moreover, if it is judged at S235 that the road is not a climbing (uphill) road-(but a descending road), the control is passed to S237. The setting unit 90 sets the correction factors, of which values are associated with the sensibility levels listed in the item number 18 in the Table 1, for the vehicle behavior control units 50, 60, 70, and 80, respectively.

In this case, similarly to when the correction factors assume values associated with the sensibility levels listed in the item number 15, the clutch tightening force correction factor Ktr for the front-rear traction distribution control unit 50 is set to a value associated with the level 3. The ABS sensibility correction factor KABS for the anti-lock brake control unit 60 is set to a value associated with the level 3. The TCS sensibility correction factor KTCS for the traction control unit 70 is set to a value associated with the level 4. The oversteering VDC sensibility correction factor KVDO or the understeering VDC sensibility correction factor KVDU for the braking power control unit 80 is set to the value associated with the level 2 or the level 3, respectively.

In contrast, if it is judged at S204 that the situation of the road is not wet and paved (but dry and paved), the control is passed to S238. It is then judged whether the shape of the road is curved. If the shape of the road is curved, the control is passed to S239. It is then judged whether the shape of the road is horizontal (flat).

If it is judged at S239 that the shape of the road is horizontal (flat), the control is passed to S240. The setting unit 90 sets the correction factors, of which values are associated with the sensibility levels listed in item number 19 in Table 1, for the vehicle behavior control units 50, 60, 70, and 80, respectively.

Specifically, the clutch tightening force correction factor Ktr for the front-rear traction distribution control unit 50 is set to a value associated with the level 1. The ABS sensibility correction factor KABS for the anti-lock brake control unit 60 is set to a value associated with the level 3. The TCS sensibility correction factor KTCS for the traction control unit 70 is set to the value associated with the level 4. The oversteering VDC sensibility correction factor KVDO or the understeering VDC sensibility correction factor KVDU for the braking power control unit 80 is set to the value associated with the level 3 or the level 4, respectively. Herein, the understeering VDC sensibility correction factor KVDU is associated with the level 4, because when the situation of the road is dry and paved, the road friction coefficient is larger than it is when the situation of the road is wet and paved. Consequently, gripping force the tires exert in gripping the road is hardly lost.

In contrast, if it is judged at S239 that the shape of the road is not horizontal, the control is passed to S241. It is then judged whether the road is a climbing (uphill) road. If the road is the climbing road, the control is passed to S242. The setting unit 90 sets the correction factors, of which values are associated with the sensibility levels listed in item number 20 in Table 1, for the vehicle behavior control units 50, 60, 70, and 80, respectively.

Specifically, the clutch tightening force correction factor Ktr for the front-rear traction distribution control unit 50 is set to a value associated with level 2. The ABS sensibility correction factor KABS for the anti-lock brake control unit 60 is set to a value associated with level 3. The TCS sensibility correction factor KTCS for the traction control unit 70 is set to a value associated with level 5. The oversteering VDC sensibility correction factor KVDO or the understeering VDC sensibility correction factor KVDU for the braking power control unit 80 is set to a value associated with the level 4. These settings are identical to the settings associated with the sensibility levels listed in the item number 14 except that the clutch tightening force correction factor Ktr is associated with the level 2 at which the front-rear traction distribution control unit permits release of the clutch.

Moreover, if it is judged at S241 that the road is not a climbing road (but a descending road), the control is passed to S243. The setting unit 90 sets the correction factors, of which values are associated with the sensibility levels listed in the item number 21 in Table 1, for the vehicle behavior control units 50, 60, 70, and 80, respectively.

Specifically, the clutch tightening force correction factor Ktr for the front-rear traction distribution control unit 50 is set to a value associated with level 2. The ABS sensibility correction factor KABS for the anti-lock brake control unit 60 is set to the value associated with the level 3. The TCS sensibility correction factor KTCS for the traction control unit 70 is set to a value associated with the level 4. The oversteering VDC sensibility correction factor KVDO or the understeering VDC sensibility correction factor KVDU for the braking power control unit 80 is set to the value associated with the level 3. Herein, the TCS sensibility correction factor KTCS is associated with the level 4, because when the situation of the road is wet and paved, the road frictional resistance is larger than it is when the situation of the road is wet and paved. Consequently, the gripping force the tires exert in gripping the road is hardly lost.

Moreover, if it is judged at S238 that the shape of the road is not curved, the control is passed to S244. It is then judged whether the shape of the road is horizontal (flat).

If it is judged at S244 that the shape of the road is horizontal (flat), the control is passed to S245. The setting unit 90 sets the correction factors, of which values are associated with the sensibility levels listed in item number 22 in Table 1, for the vehicle behavior control units 50, 60, 70, and 80, respectively.

In this case, similarly to when the correction factors assume values associated with the sensitivity levels listed in the item number 19, the clutch tightening force correction factor Ktr for the front-rear traction distribution control unit 50 is set to the value associated with the level 1. The ABS sensibility correction factor KABS for the anti-lock brake control unit 60 is set to a value associated with the level 3. The TCS sensibility correction factor KTCS for the traction control unit 70 is set to a value associated with the level 4. The oversteering VDC sensibility correction factor KVDO or the understeering VDC sensibility correction factor KVDU for the braking power control unit 80 is set to a value associated with the level 3 or the level 4, respectively.

Moreover, if it is judged at S244 that the shape of the road is not horizontal, the control is passed to S246. It is then judged whether the road is a climbing (uphill) road. If the road is the climbing road, the control is passed to S247. The setting unit 90 sets the correction factors, of which values are associated with the sensitivity levels listed in the item number 23 in Table 1, for the vehicle behavior control units 50, 60, 70, and 80, respectively.

In this case, similarly to when the correction factors assume values associated with the sensitivity levels listed in the item number 20, the clutch tightening force correction factor Ktr for the front-rear traction distribution control unit 50 is set to a value associated with the level 2. The ABS sensibility correction factor KABS for the anti-lock brake control unit 60 is set to the value associated with the level 3. The TCS sensibility correction factor KTCS for the traction control unit 70 is set to the value associated with the level 5. The oversteering VDC sensibility correction factor KVDO or the understeering VDC sensibility correction factor KVDU for the braking power control unit 80 is set to the value associated with the level 4.

Moreover, if it is judged at S246 that the road is not a climbing road (but a descending road), the control is passed to S248. The setting unit 90 sets the correction factors, of which values are associated with the sensitivity levels listed in the item number 24 in Table 1, for the vehicle behavior control units 50, 60, 70, and 80, respectively.

In this case, similarly to when the correction factors assume values associated with the sensitivity levels listed in the item number 21, the clutch tightening force correction factor Ktr for the front-rear traction distribution control unit 50 is set to a value associated with the level 2. The ABS sensibility correction factor KABS for the anti-lock brake control unit 60 is set to the value associated with the level 3. The TCS sensibility correction factor KTCS for the traction control unit 70 is set to the value associated with the level 4. The oversteering VDC sensibility correction factor KVDO or the understeering VDC sensibility correction factor KVDU for the braking power control unit 80 is set to a value associated with the level 3.

According to the present embodiment of the present invention, the setting unit 90 selects values as correction factors from among the presetted values according to the situation of the road and the shape thereof. Herein, The situation of the road signifies the snowy road, the dirt road, the wet paved road, or the dry paved road. The shape of the road signifies the curved road or not, the climbing road, the descending road, or the horizontal road. The setting unit 90 then sets the correction factors for the vehicle behavior control units 50, 60, 70, and 80, respectively so that the actions of the vehicle behavior control units 50, 60, 70, and 80 will be balanced with each other. Consequently, the vehicle behavior control units 50, 60, 70, and 80 act efficiently to optimize the motion of the vehicle.

Moreover, the correction factors the setting unit 90 sets assume preset values depending on the situation of the road and the shape thereof. The vehicle behavior control units 50, 60, 70, and 80 can therefore act at optimal timings while responding quickly to the situation of the road and the shape thereof.

Incidentally, the road friction coefficient relative to the snowy road ranges from approximately 0.1 to 0.4. The road friction coefficient relative to the dirt road ranges from approximately 0.2 to 0.8. The road friction coefficient relative to the wet paved road ranges from approximately 0.6 to 0.8. The road friction coefficient relative to the dry paved road ranges from approximately 0.9 to 1.0. When an attempt is made to control the behavior of the vehicle according to the road friction coefficient alone, the behavior of the vehicle may not be controlled optimally, though it depends on the situation of the road and the shape thereof. However, according to the present embodiment, the control actions of the vehicle behavior control units are corrected based on the situation of the road and the shape thereof. This results in the further optimized control actions of the vehicle behavior control units.

According to the present embodiment, the four control units; that is, the front-rear traction distribution control unit 50, the anti-lock brake control unit 60, the traction control unit 70, and the braking power control unit 80 are taken for instance as the vehicle behavior control means. The present invention is not limited to these control units. Alternatively, the setting unit 90 may set correction factors for the other vehicle behavior control units (for example, a limited slip differential-for-right-and-left wheels control unit, a power distribution-to-right-and-left wheels control unit, and a rear-wheels steering unit). Moreover, the number of vehicle behavior control means is not limited to four but may be two, three, or five or more.

As described so far, according to the present invention, a plurality of vehicle behavior control units mounted in a vehicle act efficiently according to the situation of the road, on which the vehicle is driven, and the shape thereof while quickly responding to the situation of the road and the shape thereof. Consequently, the motion of the vehicle can be controlled optimally.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle dynamics control system comprising:
    road information recognizing means for detecting and recognizing a situation of a road and a shape of the road;
    vehicle behavior control means for controlling a behavior of the vehicle, said vehicle behavior control means including at least a braking power control unit for controlling the behavior of the vehicle by using a braking force; and
    variable control means for, according to the situation of the road and the shape of the road, freely varying at least one of a magnitude of control and a sensibility of said vehicle behavior control means in intervening in associated control actions,
    wherein said braking power control unit judges whether a driving condition of the vehicle signifies a tendency toward one of oversteering and understeering; and wherein said variable control means varies a sensibility of said braking power control unit in intervening in an associated control action depending on whether the control action is performed to cope with the tendency toward the oversteering or the understeering according to the situation of the road and the shape of the road.

2. The vehicle dynamics control system according to claim 1, wherein the situation of the road recognized by said road information includes means is at least one of snowy, unpaved, wet and paved, and dry and paved conditions.

3. The vehicle dynamics control system according to claim 2, wherein said vehicle behavior control means further includes at least one of a front-rear traction distribution control unit for four wheel drive vehicles, an anti-lock brake control unit, and a traction control unit.

4. The vehicle dynamics control system according to claim 2, wherein the shape of the road recognized by said road information means includes curved and not curved.

5. The vehicle dynamics control system according to claim 4, wherein said vehicle behavior control means further includes at least one of a front-rear traction distribution control unit for four wheel drive vehicles, an anti-lock brake control unit, and a traction control unit.

6. The vehicle dynamics control system according to claim 4, wherein the shape of the road recognized by said road information recognizing means includes at least one of a climbing, descending, and horizontal shape.

7. The vehicle dynamics control system according to claim 6, wherein said vehicle behavior control means further includes at least one of a front-rear traction distribution control unit for four wheel drive vehicles, an anti-lock brake control unit, and a traction control unit.

8. The vehicle dynamics control system according to claim 2, wherein the shape of the road recognized by said road information recognizing means includes at least one of a climbing, descending, and horizontal shape.

9. The vehicle dynamics control system according to claim 8, wherein said vehicle behavior control means further includes at least one of a front-rear traction distribution control unit for four wheel drive vehicles, an anti-lock brake control unit, and a traction control unit.

10. The vehicle dynamics control system according to claim 1, wherein the shape of the road recognized by said road information recognizing means includes curved or not curved.

11. The vehicle dynamics control system according to claim 10, wherein said vehicle behavior control means further includes at least one of a front-rear traction distribution control unit for four wheel drive vehicles, an anti-lock brake control unit, and a traction control unit.

12. The vehicle dynamics control system according to claim 10, wherein the shape of the road recognized by said road information recognizing means includes at least one of a climbing, descending, and horizontal shape.

13. The vehicle dynamics control system according to claim 12, wherein said vehicle behavior control means further includes at least one of a front-rear traction distribution control unit for four wheel drive vehicles, an anti-lock brake control unit, and a traction control unit.

14. The vehicle dynamics control system according to claim 1, wherein the shape of the road recognized by said road information recognizing means includes at least one of a climbing, descending, and horizontal shape.

15. The vehicle dynamics control system according to claim 14, wherein said vehicle behavior control means further includes at least one of a front-rear traction distribution control unit for four wheel drive vehicles, an anti-lock brake control unit, and a traction control unit.

16. A vehicle having the vehicle dynamics control system of claim 1.

* * * * *